US012704122B2

(12) United States Patent
Ownby

(10) Patent No.: US 12,704,122 B2
(45) Date of Patent: Aug. 11, 2026

(54) DEVICE FOR POWER WASHING WITH REMOTE CONTROL OPERATION SYSTEM, METHOD, AND DEVICE AND SYSTEMS FOR REMOTE CONTROLLED POWER WASHING

(71) Applicant: Daniel Dean Ownby, Lancaster, OH (US)

(72) Inventor: Daniel Dean Ownby, Lancaster, OH (US)

( * ) Notice: Subject to any disclaimer, the term of this patent is extended or adjusted under 35 U.S.C. 154(b) by 686 days.

(21) Appl. No.: 17/519,048

(22) Filed: Nov. 4, 2021

(65) Prior Publication Data

US 2022/0136496 A1 May 5, 2022

Related U.S. Application Data

(60) Provisional application No. 63/109,384, filed on Nov. 4, 2020.

(51) Int. Cl.

| | |
|---|---|
| ***B08B 3/02*** | (2006.01) |
| ***F04B 49/06*** | (2006.01) |
| ***G08C 17/02*** | (2006.01) |

(52) U.S. Cl.

CPC .............. *F04B 49/06* (2013.01); *B08B 3/026* (2013.01); *G08C 17/02* (2013.01); *B08B 2203/007* (2013.01); *B08B 2203/0223* (2013.01); *F04B 2207/041* (2013.01); *G08C 2201/30* (2013.01)

(58) Field of Classification Search

CPC ................ B08B 3/026; B08B 2203/02; B08B 2203/0223; B08B 2203/0241; B05B 12/00; B05B 12/002; B05B 12/08; B05B 12/085; B05B 12/14; B05B 12/1409; B05B 9/01; B05B 9/0416

See application file for complete search history.

(56) References Cited

U.S. PATENT DOCUMENTS

| | | | | |
|---|---|---|---|---|
| 4,531,488 A * | 7/1985 | Kawamura | F02M 63/02 | 417/462 |
| 4,850,536 A * | 7/1989 | Teranishi | G02B 6/3897 | 398/1 |
| 5,407,537 A * | 4/1995 | Malatesta | D21H 21/50 | 162/158 |
| 2002/0136624 A1* | 9/2002 | Ablabutyan | F15B 11/0423 | 414/556 |

(Continued)

FOREIGN PATENT DOCUMENTS

WO WO-2017096740 A1 * 6/2017 .......... B05B 12/002

*Primary Examiner* — David G Cormier

(74) *Attorney, Agent, or Firm* — Standley Law Group LLP; Beverly A. Marsh; Kenny W. Pung

(57) ABSTRACT

A system and device for remote control operated power washing includes a wireless radio transmitter and a receiver in communication with the transmitter. The transmitter in preferred embodiments has a water flow rate selector which provides for selecting between various water flow rate settings. When the receiver is electronically connected to a motor which is physically connected to a pump supplied with a water source and a hose, and at least the motor has been started, using the transmitter to select between the various water flow rate settings enables the water flow rate output by the hose to change without having to change attachments that might be utilized in conjunction with a power washer.

13 Claims, 21 Drawing Sheets

(56) References Cited

U.S. PATENT DOCUMENTS

| | | | | |
|---|---|---|---|---|
| 2005/0109376 | A1* | 5/2005 | Gregory | B08B 9/0936<br>134/198 |
| 2015/0102121 | A1* | 4/2015 | Dey | B05B 9/01<br>239/69 |
| 2018/0118172 | A1* | 5/2018 | Dallos, Jr. | B60S 1/50 |
| 2018/0133729 | A1* | 5/2018 | Masters | A47L 11/4091 |
| 2019/0388923 | A1* | 12/2019 | Giacalone | B05B 12/00 |

* cited by examiner

DEVICE FOR POWER WASHING WITH REMOTE CONTROL OPERATION SYSTEM, METHOD, AND DEVICE AND SYSTEMS FOR REMOTE CONTROLLED POWER WASHING

CROSS REFERENCE TO RELATED APPLICATIONS

This application claims priority to U.S. Provisional Application No. 63/109,384 which was filed on Nov. 4, 2020, the disclosure of which is incorporated herein fully by reference.

FIELD OF THE INVENTION

The present invention relates to remote-control operated devices for power washing and systems for remote-controlled power washing. More particularly, exemplary embodiments concern a receiver electronically connected to and in communication with a power washing device (and/or a receiver which is adapted to be so connected to a power washing device) wherein the receiver is adapted to receive and respond to signals from a hand-held wireless transmitter. The receiver is computerized in preferred embodiments. The receiver is preferably adapted to, among other things, vary which circuit out of a plurality of circuits will be utilized to supply power to a motor of a device for power washing in response to signals the receiver receives from the transmitter. In a preferred embodiment, the circuits each have a different level of resistance. Thus, the voltage supplied to the motor can be varied depending on the circuit utilized, so that the rotational speed of the motor may be altered remotely during use of the device. The preferred power washing device comprises a motor connected to at least one pump, so that varying the rotational speed of the motor preferably also changes the speed of the at least one pump as well as the flow of the water out of the at least one pump (when the pump is connected to a water source).

BACKGROUND AND SUMMARY OF THE INVENTION

Power Washers are known in the art. They are utilized to provide a high-pressured flow of water that can be utilized for cleaning the exterior of homes, driveways, automobiles, paint removal, etc. The known power washers generally comprise a manually activated motor that provides power to a water pump, a water inlet that gets connected to a water source which provides a supply of water to the pump, a high-pressure hose that receives water under pressure from the pump, and a handheld wand with nozzle attachments. The flow of water from the handheld wand and (if applicable) attachments is typically controlled by selectively applying pressure to a handle. While some residential power washers utilize an electric-powered motor, bigger and commercial power washers generally operate on gas powered motors. In known power washers, the power of the motor utilized in combination with the pressure created within the pump, generates a high-pressure water stream of a given psi. The water flow can be emitted from the wand when the handle is selected. Each power washer has a given psi rating based on its motor and pump combination. Users of these power washers can subsequently vary the pressure of the outgoing water stream for various applications in some degree by selecting from different wands and nozzle attachments. Increasing or decreasing the distance between the end of the wand/nozzle attachment and the surface being cleaned, etc. with the power washer also provides for some variance in water pressure. However, the rate of water flow out of the machine cannot generally be increased above some maximum flow rating that is based on the motor and pump combination.

While the foregoing may be workable for residential projects where time is not of the essence and in cases where the water flow rating needed does not vary significantly/meaningfully from project to project, there is a need in the art for a single device for power washing which can quickly and easily provide output water flows of meaningfully, varied flow ratings and for systems adapted to enable such devices. For example, a professional power washer is often asked to address, clean, etc. several different surfaces for the same client. The water flow rating needed to remove paint from a house is very different from that needed to remove dirt and grime from a deck surface. Professional power washers waste time, and therefore money, not being able to quickly and easily modify the flow rating (typically provided in the amount of gallons per minute) of the water output in a meaningful way while they are on the job. They also typically spend additional money on acquiring numerous power washer devices to supply them with various flow ratings. Not only is this inefficient economically, but it is cumbersome hauling around numerous power washers.

Exemplary systems of the present invention comprise a computerized receiver adapted to be in communication with and electronically connected to a motor, at least one pump, and at least one power washing accessory wherein the receiver can receive signals from a wireless, hand held transmitter. In a preferred exemplary embodiment, the device for power washing comprises a single pump and no additional pumps. The signals sent by the transmitter and received by the receiver are preferably radio waves. When connected to a motor, the receiver can preferably, among other things, cause the motor to receive power of various voltages in response to signals the receiver receives from the transmitter. Preferably, this is accomplished using a plurality of circuits each circuit having a different electronic resistance. A preferred exemplary embodiment comprises 4 different circuits for controlling the speed of a motor electronically connected to the motor and the receiver wherein each of the 4 circuits has a different electronic resistance. In preferred embodiments, the receiver decodes radio wave signals sent out from the handheld, wireless transmitter and based on the signals it receives, the receiver (among other things) selects the appropriate circuit through which power should be supplied to the motor of a device for power washing and sends power to that circuit. The speed of the motor preferably increases when the voltage it receives during operation is increased. Conversely, the speed of the motor preferably decreases when the voltage the motor receives is decreased. So, by sending power through different circuits of varying resistance, the receiver enables various motor speeds.

The signal indicating which speed the motor should run at is preferably sent by the transmitter based on which water flow rate setting is selected using a water flow rate selector on the transmitter. In some embodiments, the transmitter comprises a button that must be pushed after making a flow rate selection with the transmitter's flow rate selector to send the signal to the receiver to change/set the motor speed (hence activating the chosen water flow rate setting). When the system is connected to a device for power washing comprising a motor that is connected to a pump and a water source connected to the pump, increasing and decreasing the motor speed preferably causes the pump speed, and hence the water flow through the pump, to increase and decrease as well. Thus, the system enables remote-controlled power washing in which a power washing device can quickly and easily provide output water flows of meaningfully, varied flow ratings.

Exemplary devices for power washing of the present application comprise a motor that is capable of operation by remote control. In a preferred exemplary embodiment, the motor is capable of remote-control operation as a result of a computerized receiver electronically connected to or integrated into the motor that can receive signals from a hand-held, wireless transmitter that enables the motor to be remotely powered on and off, and also permits for the user to remotely vary the amount of power supplied to the motor which in turn alters the motor's output speed. The motor is connected to at least one pump which can be operated when power is supplied to the motor and it has been turned on. The more power supplied to the motor in the preferred exemplary embodiment, the more quickly the motor and the at least one pump can be turned and the greater the flow rate of water out of the pump. Thus, a single motor and at least one pump are capable of supplying output streams of water that vary meaningfully in terms of their flow rating without the user having to physically approach the motor or change devices. In some preferred embodiments, the device for power washing has only a single motor. In some preferred embodiments, the device for power washing has only a single pump. With some preferred embodiments, a single device for power washing having just one remote-control operated motor can provide its user with flow ratings ranging from 5 gallons of water per minute to 12 gallons of water per minute.

In preferred exemplary embodiments of the inventive system and device, the hand-held transmitter has a water flow rate selector comprising at least two (preferably four) water flow rate settings and a separate push button the user can select (i.e. by pushing the button) to cause the transmitter to send a signal to the receiver activating the water flow rate of a connected device after a selection has been made using the transmitter's water flow rate selector.

In some embodiments, the transmitter may comprise a button for at least actuating (the button may also deactivate the pump) at least one pump as well as at least one push button for engaging and disengaging at least one accessory (i.e. soap, heat, etc.) of a device for power washing. In such an embodiment, engaging a push-button on the transmitter may send a signal to the computer/receiver which causes the motor to be turned on, but the pump is not automatically engaged. Engaging a second push-button on the transmitter thereafter may cause the pump to be actuated which generates a flow of water out of the pump (assuming the pump is supplied with water as would be expected during operation). The same push button on the transmitter may be pushed again causing the pump to be deactivated and ceasing the flow of water out of the pump. The pump may receive water from an inlet connected to at least one water tank, a hose, etc. The transmitter may comprise a dial which may be turned clockwise and counterclockwise to send signals to the computer receiver that vary the voltage supplied to the motor. Turning the dial one direction (i.e. clockwise) may cause the voltage to the motor to be increased up to a certain amount, while turning the dial in the opposite direction (i.e. counterclockwise) may cause the voltage being supplied to the motor to be decreased down to some minimum value.

In addition to having push-buttons on the transmitter that enable remote powering on and off of the motor, activating a water flow rate selection, and engagement and disengagement of the at least one pump and at least one accessory, some exemplary embodiments comprise at least one push-button on the receiver (i.e. the computer connected to or integrated into the motor) so that the motor can be powered on and off and the at least one pump and accessory can be actuated and deactivated without the transmitter. The receiver may also comprise a dial which permits for various flow rates of water output by the pump to be selected (in some embodiments by varying the voltage being supplied to the motor).

In another exemplary embodiment, a remote-control operated device for power washing comprises a motor that is connected to or which has an integrated computer that receives signals from a hand-held transmitter. The received signals enable the motor to be remotely powered on and off. The motor is connected to a first pump and a second pump which are both in connectivity with water source and a high-pressure hose. After the motor is remotely powered on, the transmitter can be used to send a signal to the computer actuating the first pump and causing a flow of water to be generated out of the pump and into the hose. If a higher flow rating of water is needed, the transmitter can be used to send a signal to the computer causing the second pump to be actuated. Using the two pumps at once causes greater water flow through the hose and thus a greater flow rating of water. Preferably, at least one push button on the transmitter permits for the first and second pumps to be deactivated when a lesser psi or no water flow is desired.

In addition to the novel features and advantages mentioned above, other benefits will be readily apparent from the following descriptions of the drawings and exemplary embodiments.

DETAILED DESCRIPTION OF EXEMPLARY EMBODIMENT(S)

Figure 1:
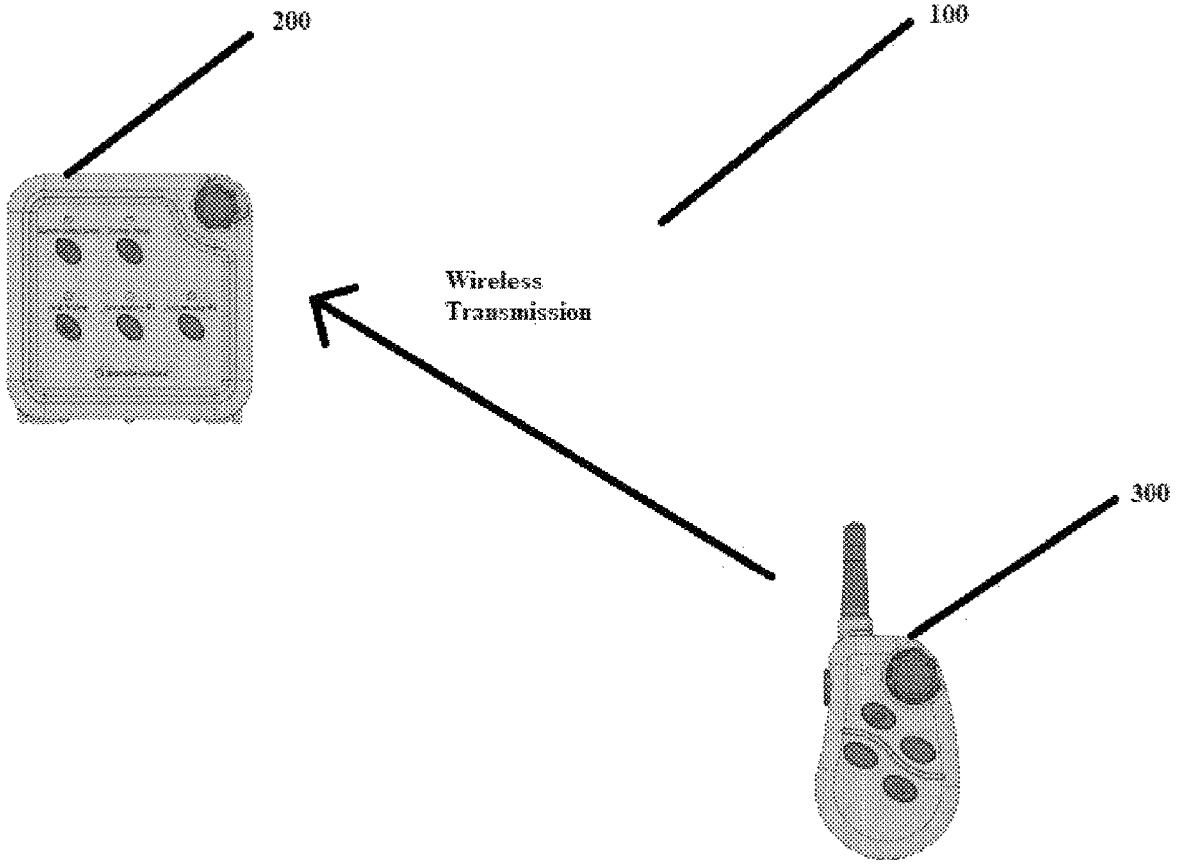
FIG. 1 shows a front view of an exemplary system of the present invention.

An exemplary system 100 of the present invention is shown in FIG. 1 and comprises a computerized receiver 200 adapted to be in communication with and electronically connected to a device for power washing comprising a motor connected to (directly or indirectly depending on the embodiment) and powering a water pump said pump connected to a water source, and at least one power washing accessory. The receiver 200 can receive and decode signals from a wireless, hand held transmitter 300 that enables a connected device for power washing to output various water flow rates and water pressures without having to change accessories on a spray gun of the device for power washing. Note that the transmitter 300 is not physically connected to the receiver 200, the motor, pump, or the at least one power washing accessory.

The signals sent by the transmitter 300 and received by the receiver 200 are preferably radio waves. When connected to and electronically communicating with the device for power washing, the receiver 200 can preferably, among other things, cause the motor to receive various voltages in response to certain signals the receiver 200 receives from the transmitter 300. Preferably, this is accomplished using a plurality of electronic circuits wherein each circuit has a different electronic resistance. Preferably, there are at least four to five different circuits in system 100 each of which enables a motor of a connected power washer device to rotate at a given speed. In preferred embodiments, the receiver 200 decodes radio wave signals sent out from the transmitter 300 and based on the signals it receives, the receiver 200 (among other things) selects the appropriate circuit through which power should be supplied to the motor and causes power to be sent to that circuit and then to the motor. The speed of the motor preferably increases when the voltage it receives during operation is increased. Conversely, the speed of the motor preferably decreases when the voltage the motor receives is decreased. So, by sending power through different electronic circuits of varying electronic resistance, the receiver 200 enables various motor speeds. When the system 100 is connected to a device for power washing comprising a motor that is connected to and controlling a water pump connected to a water source, increasing and decreasing the motor speed causes the pump speed, and hence water flow through the pump, to increase and decrease as well. Thus, the system 100 enables remote-controlled power washing in which a power washing device can quickly and easily provide output water flows of meaningfully, varied flow ratings.

Figure 2:
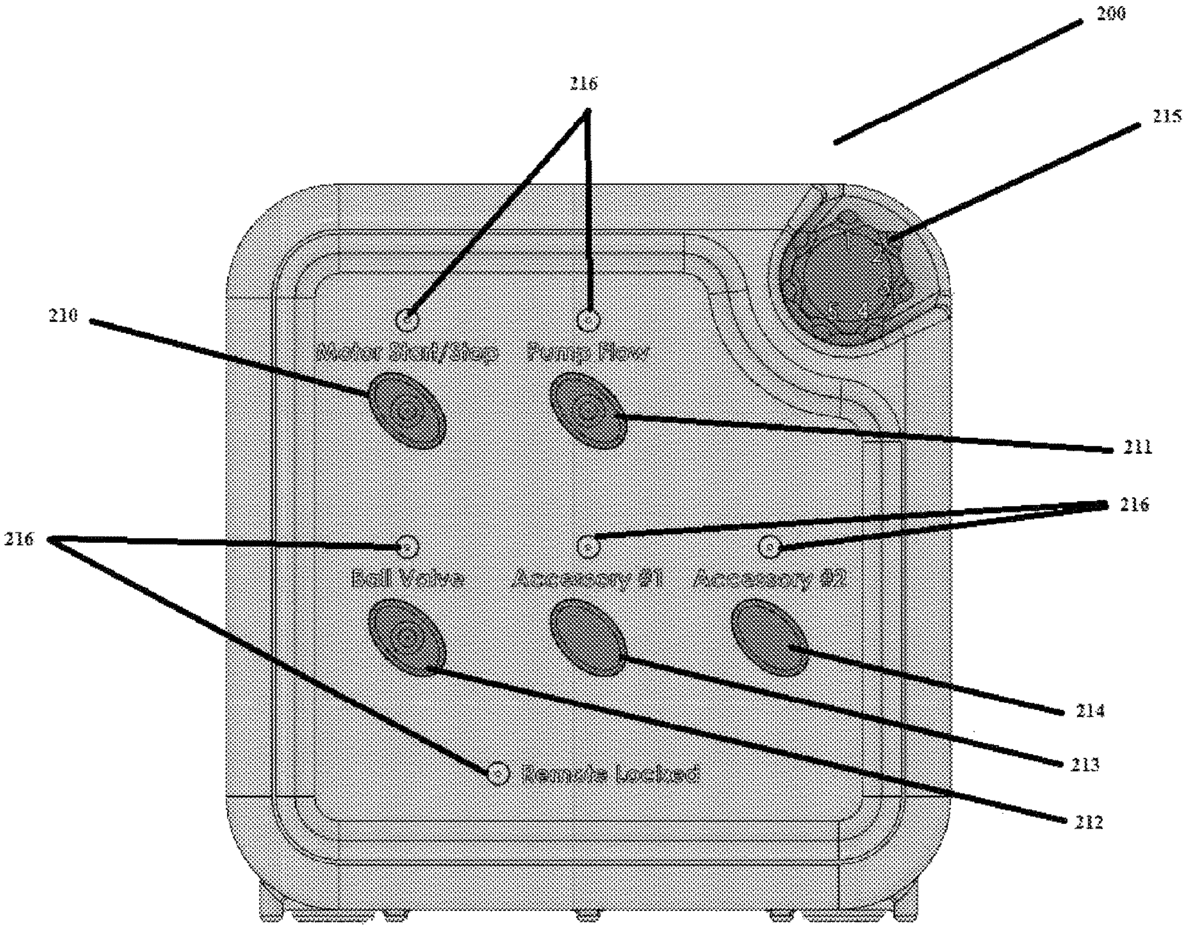
FIG. 2 shows a front view of an exemplary receiver of the system and device of the present invention.
Figure 3:
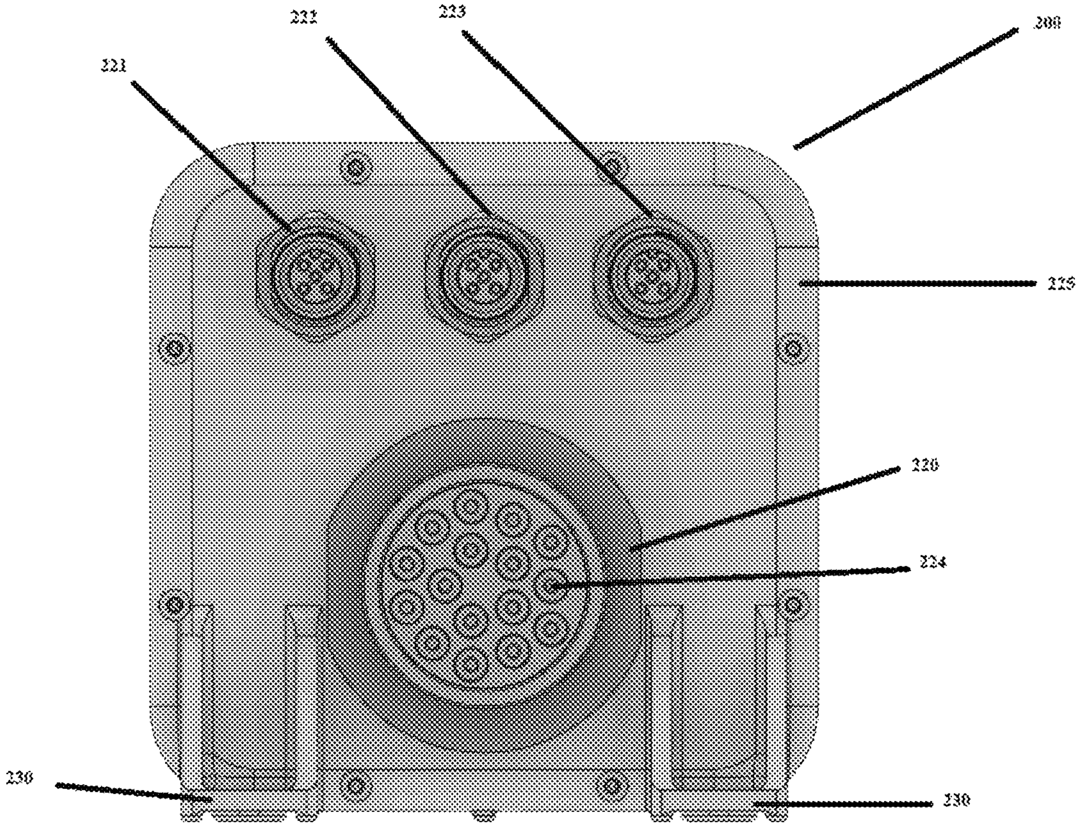
FIG. 3 shows a rear view of the exemplary receiver shown in FIG. 2.
Figure 4:
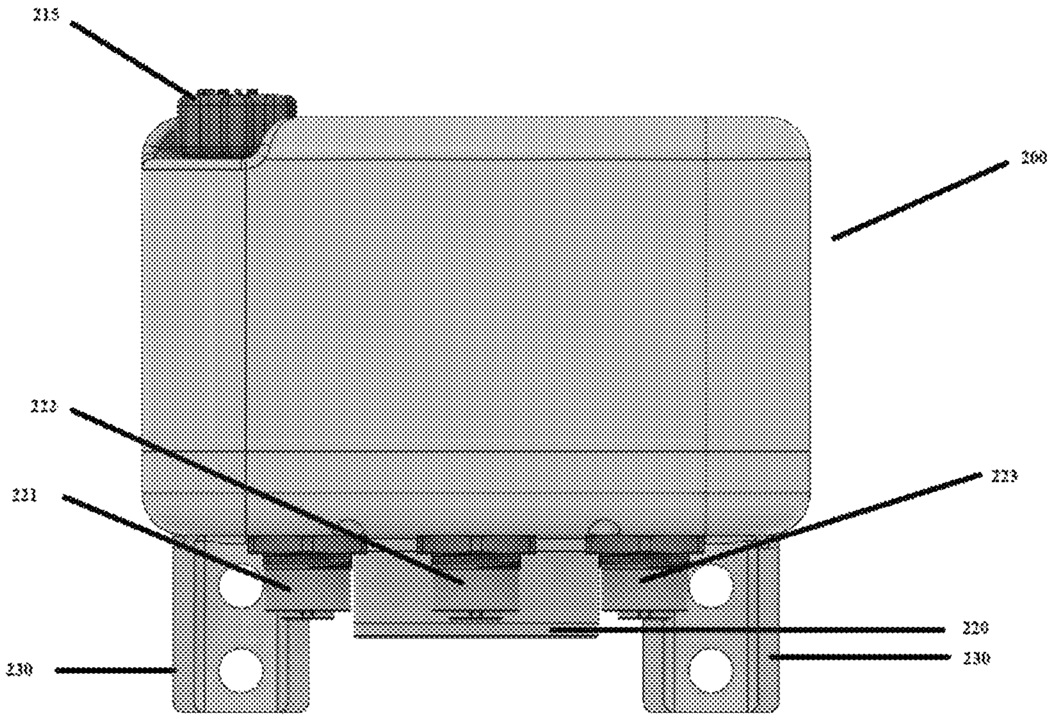
FIG. 4 shows a top view of the exemplary receiver shown in FIGS. 1, 2, and 3.
Figure 5:
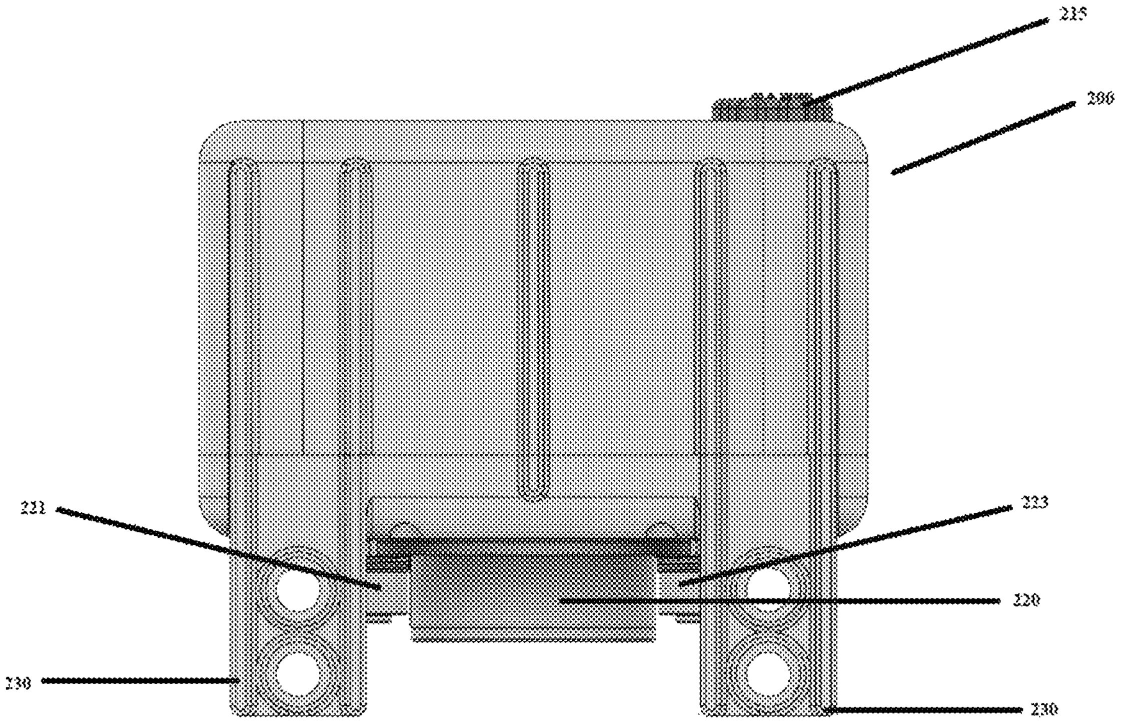
FIG. 5 shows a bottom view of the exemplary receiver for enabling remote control operation of a device for power washing shown in FIGS. 2, 3, and 4.
Figure 6A:
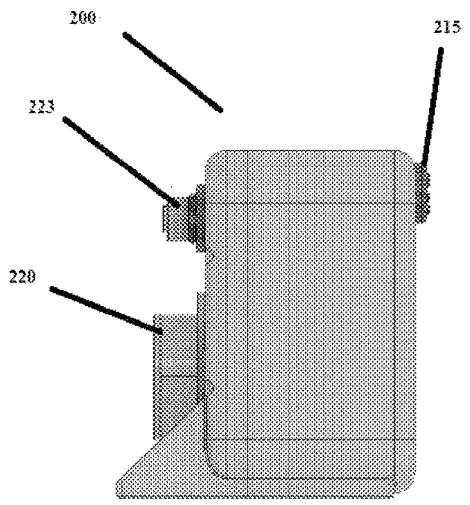
FIG. 6 shows a left side view of the exemplary receiver shown in FIGS. 2 through 5 in FIG. 6(*a*) and a right side view of the exemplary receiver shown in FIGS. 2 through 5 in FIG. 6(*b*)
Figure 6B:
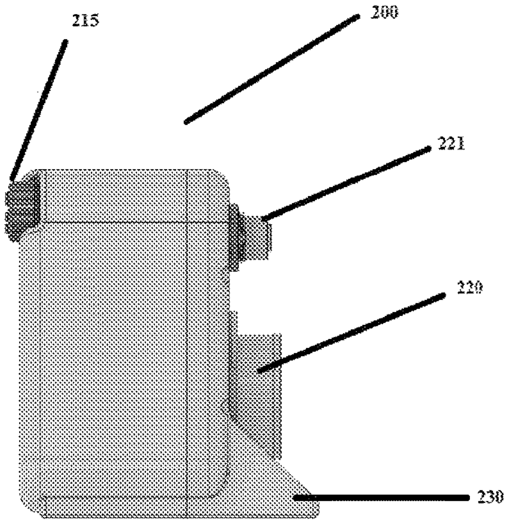

An exemplary receiver 200 of the inventive system 100 for remote controlled power washing can be seen in FIGS. 2 through 6. The receiver 200 has an antenna, which may be disposed within a housing 225 as shown in the exemplary embodiment of FIGS. 2 through 6. The receiver 200 preferably receives radio wave signals from a transmitter 300, extracts the signals, and sends the data stream to a central processing unit (CPU) within the receiver 200. The receiver's CPU preferably decodes the data and sends commands to a command module within the receiver 200. In preferred exemplary embodiments, the receiver 200 also comprises a plurality of input buttons that a user of the system can select to provide instructions to the receiver 200 when the transmitter 300 is not being utilized. As shown in FIG. 2, the exemplary receiver 200 comprises a motor start/stop button 210 that a user of the system 100 can use to start and stop the motor of a device for power washing when the receiver 200 has been electronically connected to the device. As shown, the exemplary receiver 200 additionally comprises a pump flow button 211 that a user of the system can select to activate a water flow rate of a connected device for power washing. Including button 211 can prevent the flow rate of a connected device for power washing from being inadvertently changed.

Receiver 200 preferably comprises a water flow rate selector 215 comprising different water flow rate settings that a user of the system can utilize to select between various flow rates/water pressures of the water flow being dispensed by a connected power washer device. As shown in the exemplary embodiment of FIG. 2, the flow rate selector 215 is a dial comprising a plurality of flow rate settings. Preferably, at least two of the settings of the selector 215 correspond to different water flow rates/water pressures that can be output from a connected power washer device. In the preferred exemplary embodiment, at least 4 positions of the selector 215 correspond to circuits through which power can be sent before being received by the motor of a connected device for power washing. Preferably, each of the circuits has a different electrical resistance such that utilization of the various circuits causes the motor to rotate at different speeds and hence causes a connected pump to rotate at different speeds. As shown in the FIG. 2 embodiment, four of the settings on the selector 215 correspond to a difference flow rate/water pressure that can be provided by a connected power washing device. Though the exemplary receiver 200 shown in FIG. 2 utilizes a dial for the flow/pressure selector 215, other exemplary embodiments may utilize a toggle, plurality of buttons, etc.

In the preferred exemplary embodiment shown in FIG. 2, once a user makes a flow rate selection using the flow rate selector 215, the user engages button 211 to activate the water flow rate of a connected device to correspond to that selection. In other words, the water flow rate of a connected power washer device may not change immediately upon a flow rate selection being made with selector 215 but may instead be activated when a user engages a button 211. In other exemplary embodiments, receiver 200 may cause the speed of a connected motor (and hence the water flow rate of a connected device for power washing) to change upon a flow rate setting being selected using the flow rate selector 215 and may not require any other input from a user.

In the exemplary embodiment of FIG. 2, the receiver 200 additionally comprises three buttons 212, 213, and 214. In the exemplary receiver 200 of FIG. 2, one of the accessory buttons, 212, electronically communicates with a ball valve of a connected power washer device so that a user of the system can select button 212 to instruct the system 100 whether an open flow circuit mode or a closed flow circuit mode should be utilized. In the closed flow circuit mode, the user of the system 100 can preferably add soap, chemicals, heat, etc. to the water flow before the water is dispensed from the connected power washer device. Preferably, the soap, chemicals, etc. may be added by a user of the system by selecting at least one of the accessory buttons 213, 214. Thus one of the accessory buttons 213, 214 may correspond to soap/chemical that is helpful in power washing and by selecting that button, the user provides an instruction to the receiver 200 which the receiver 200 translates in order to communicate with a soap/chemical dispenser of a connected power washer device. In a preferred exemplary embodiment, one of the accessory buttons 213, 214 corresponds to a heating mechanism of a connected power washer device such that selecting the button causes water to be heated in the power washing device before it flows out of the device.

The receiver 200 may comprise at least one LED 216. The at least one LED 216 may be utilized to indicate that certain operations are being implemented in a connected power washer device. For example, and as shown in FIG. 2, each button may correspond with an LED 216 such that when the button has been selected and a corresponding action has occurred within a connected power washer device, the LED corresponding with the button emits light. In some embodiments, one or more LEDs 216 on the receiver 200 may emit light when a connected power washer is involved in a given operation even when the buttons on the receiver were not utilized to trigger the operation. For example, if the transmitter 300 is utilized to send an instruction to the receiver 200 to commence a certain operation (for example, powering on the motor) instead of using button 210 on the receiver 200, LED 216 on the receiver 200 that corresponds to button 210 may still emit light when the motor is successfully powered on. In a preferred exemplary embodiment, the receiver 200 comprises at least one LED 216 that will begin emitting light when a function of a connected device for power washing successfully actuates, and will remain lit as long as the function is ongoing. The receiver 200 may additionally comprise at least one LED 216 that does not correspond with any button. As shown in FIG. 2, the receiver 200 comprises an LED which emits light when the system has been instructed not to utilize signals from the transmitter 300 (the "remote locked" LED 216).

The receiver 200 is adapted to receive at least one wire that is electronic communication with a motor of a device for power washing. Preferably, the receiver 200 comprises at least one wire harness 220 and at least one accessory port 221. Preferably, the receiver 200 communicates to a connected device for power washing through wire harness 220 and the at least one accessory port 221. In the preferred receiver shown in FIG. 3, the receiver 200 comprises wire harness 220, a first accessory port 221, second accessory port 222, and a third accessory port 223. In the FIG. 3 embodiment, the accessory ports 221, 222, and 223 each correspond with and is used to electronically communicate with an accessory of a connected power washer device. Wire harness 220 preferably comprises at least one wire port 224 for receiving a wire that is connected to the motor of a power washer device. In the preferred exemplary embodiment, the wire harness comprises fourteen wire ports. The 14 wire ports 224 of the preferred exemplary embodiment are utilized to run the following 14 to a device for power washing:

a. a 5V ground;
b. a variable speed/voltage output to control the speed of the motor;
c. a 5V positive;
d. a 12V start trigger (input from the motor key used to start the motor);
e. positive battery (12V Nom);
f. Key position in, On/Off voltage level (12V; low current) from key;
g. Key position out, On/Off voltage level (12V; low current) to motor controller;
h. Oil pressure, No oil pressure is grounded and oil pressure float indicating that the motor has started;
i. High pressure water output (12V) power for pressure switch;
j. High pressure water input (12V), On/Off voltage level in from sensor;
k. 12V start trigger, output to starter to start the motor;
l. Pump clutch, on/off voltage;
m. System ground; and
n. Camshaft position sensor input.

The receiver 200 may also comprise a mounting body 230 that can be used to physically connect the receiver 220 to a power washer device. The mounting body 230 of exemplary receiver 200 comprises a pair of legs that are integral with the housing 225 of the receiver 200 wherein each leg defines at least one opening for receiving a screw, nail, etc. that can hold the receiver 200 in a desired location on the power washing device.

A preferred exemplary system 100 comprises a transmitter 300 like the one shown in FIGS. 7 through 11. As shown, exemplary transmitter 300 comprises an antenna 301 for emitting radio waves that are utilized in communicating with receiver 200. The transmitter 300 may also comprise a water flow rate selector 315 comprising a number of flow rate settings that a user of the system 100 can utilize to remotely select between various flow rates/water pressures of the water flow being dispensed by power washer device when it has been electronically connected to receiver 200. As shown in the exemplary embodiment of FIG. 7, the flow rate selector 315 is a dial having a plurality of settings. Preferably, at least several of the settings of the selector 315 correspond to different water flow rates/water pressures. As shown in the FIG. 7 embodiment, four of the settings on the selector 315 correspond to a different flow rate/water pressure that can be provided by a power washing device that is connected to receiver 200. Though the exemplary transmitter 300 shown in FIG. 7 utilizes a dial for the flow/pressure selector 315, other exemplary embodiments may utilize a toggle, plurality of buttons, etc.

In the exemplary embodiment shown in FIGS. 7 through 11, transmitter 300 further comprises a button 311 that is to be pushed by a system user to activate the water flow rate of a device for power washing after a water flow rate selection has been made using the selector 315. In such an embodiment, once one of the flow rate settings on the flow rate selector 315 is chosen (i.e. by placing the dial at the desired setting), a user may need to push button 311 to cause transmitter 300 to send a signal to receiver 200 providing instructions that the water flow rate of a device for power washing should correspond to the selected setting.

In preferred exemplary embodiments, the selector 315 on the transmitter 300 is essentially the same as or is the same as a selector 215 that is located on receiver 200. Preferably, the transmitter 300 has a selector 315 and the receiver 200 has a selector 215 wherein selector 315 and 215 may each be utilized in changing the flow rate/water pressure of water out of a power washer device that is connected to the receiver 200. The receiver 200 and transmitter 300 may each comprise a button (211 and 311 respectively) utilized to activate the water flow rate of a device for power washing after a flow rate selection has been made using flow rate selector 215 or 315.

Figure 7:
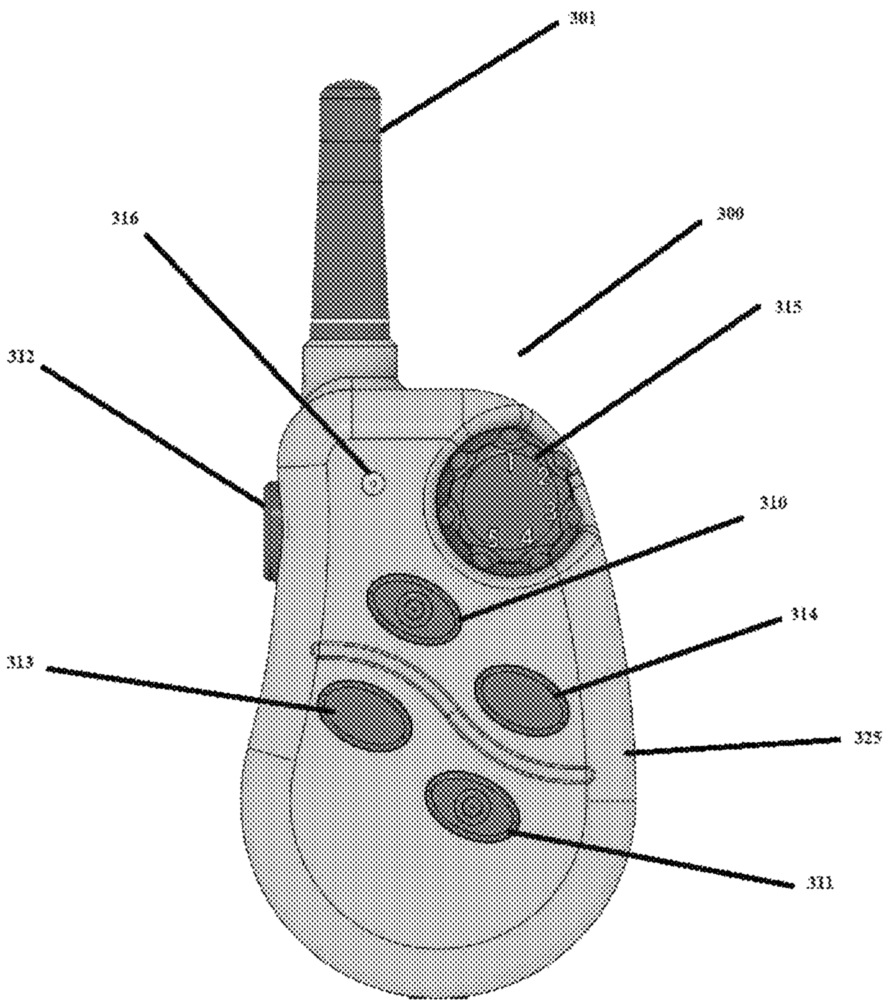
FIG. 7 shows a front view of an exemplary transmitter of a system for remote controlled power washing.
Figure 8:
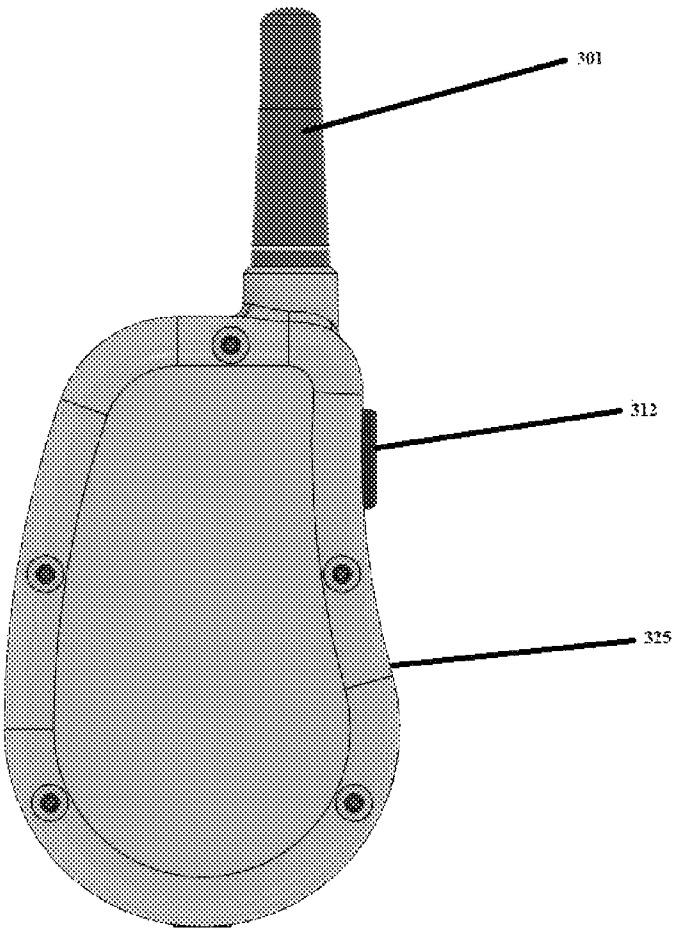
FIG. 8 shows a rear view of the exemplary transmitter shown in FIG. 7.
Figure 9:
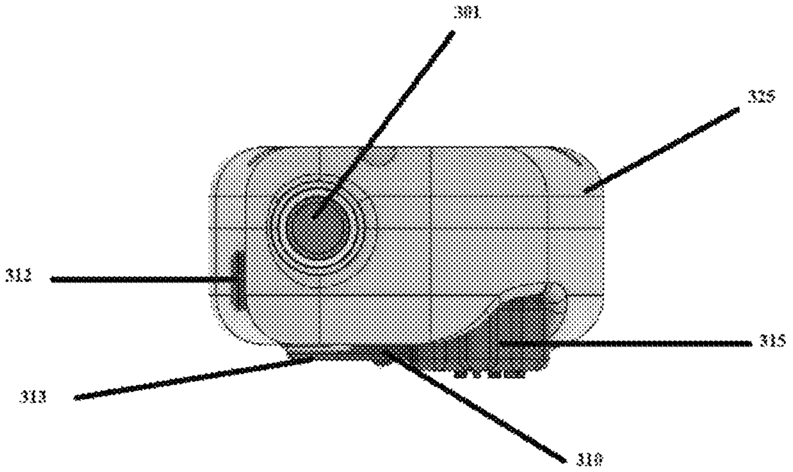
FIG. 9 shows a top view of the exemplary transmitter shown in FIG. 7.
Figure 11A:
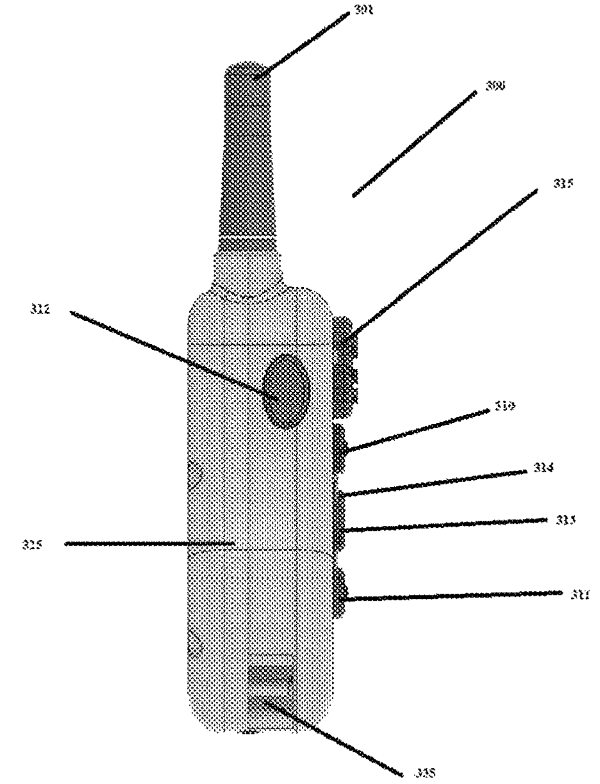
FIG. 11 shows a left side view of the exemplary transmitter in FIG. 11*a* and a right side view of the exemplary transmitter in FIG. 11*b;*
Figure 11B:
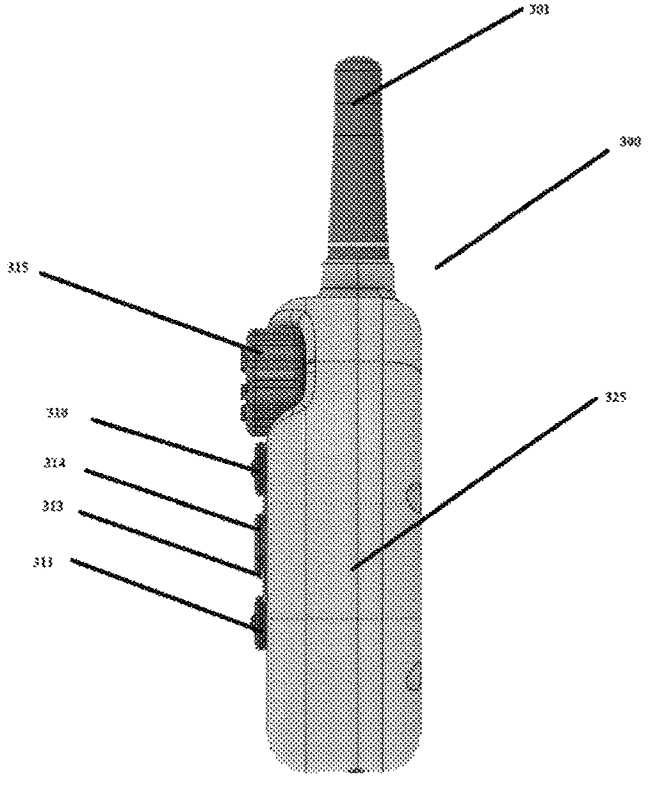

Transmitter 300 may further comprise a plurality of input buttons that a user of the system can select to provide instructions to the receiver 200. As shown in FIG. 7, the exemplary transmitter 300 comprises a motor start/stop button 310 that a user of the system 100 can use to start and stop the motor of a power washer device when the receiver 200 has been electronically connected to the device. As shown, the exemplary transmitter 300 additionally comprises a pump flow button 311 that a user of the system can select to activate the water flow rate of a device for power washing to correspond to a flow rate setting that has been selected using the flow rate selector 315. In the exemplary embodiment of FIG. 7, the transmitter 300 additionally comprises three buttons 312, 313, and 314. In the exemplary transmitter 300 of FIG. 7, one of the accessory buttons, 312, causes the transmitter 300 to sends a message to the receiver 200 to electronically communicate with a ball valve of a connected power washer device so that a user of the system can select button 312 to instruct the system 100 whether an open flow circuit mode or a closed flow circuit mode should be utilized. FIGS. 8, 9, and 11*a* illustrate how button 312 may be positioned on a side of the transmitter 300 enabling it to be more easily selected by the thumb of a user when held in the user's right hand. In the closed flow circuit mode, the user of the system 100 can preferably add soap, chemicals, heat, etc. to the water flow before the water is dispensed from the connected power washer device. Preferably, the soap, chemicals, etc. may be added by a user of the system by selecting at least one of the accessory buttons 313, 314 on the transmitter 300. Thus, one of the accessory buttons 313 or 314 may correspond to soap/chemical that is helpful in power washing and by selecting that button, the user causes the transmitter 300 to provide an instruction to the receiver 200 which the receiver 200 translates in order to communicate with a soap/chemical dispenser of a connected power washer device. In a preferred exemplary embodiment, one of the accessory buttons 313, 314 corresponds to a heating mechanism of a power washer device that is connected to receiver 200 such that selecting the button causes water to be heated in the power washing device before it flows out of the device.

In some exemplary embodiments, transmitter 300 may comprise a button that corresponds to at least the actuation (it may also correspond to the deactivation) of a pump that is connected to the motor of a device for power washing.

Transmitter 300 may comprise at least one LED 316. In a preferred exemplary embodiment, LED 316 emits light when a button on the transmitter 300 has been selected by a user. The LED 316 preferably emits light for 1.5 seconds upon release of the button. The transmitter 300 preferably comprises a housing 325 which receives and is connected to buttons 310, 311, 312, 313, and 314, water flow rate/pressure selector 315, antenna 301, and LED 316 as shown in FIG. 7.

Figure 10:
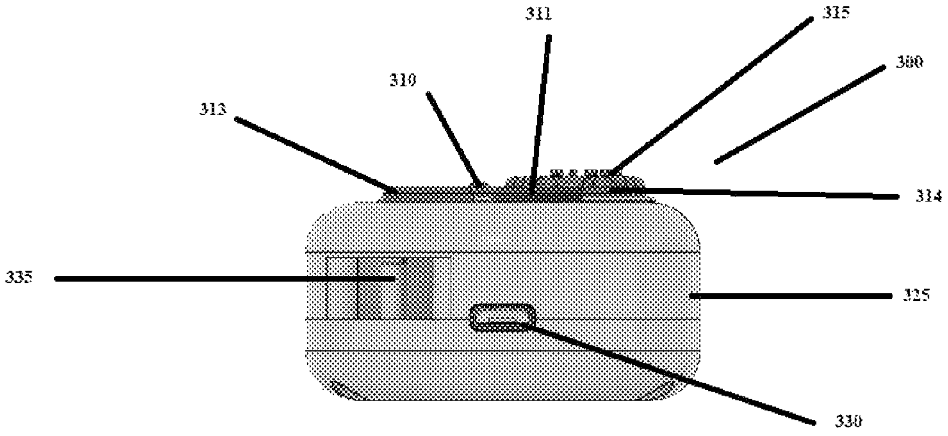
FIG. 10 shows a bottom view of the exemplary transmitter shown in FIG. 7.

As shown in FIG. 10, an exemplary transmitter 300 may comprise a charging port 330 that enables power to be supplied to a power source (i.e. a rechargeable battery) maintained within transmitter 300. However, some exemplary embodiments of transmitter 300 may utilize another type of power source such as a traditional battery and therefore no port 330 would be needed. FIG. 10 additionally illustrates how the case 325 of transmitter 300 may define a lanyard receiving body 335 which permits for transmitter 300 to be connected to a rope, string, lanyard, etc. which enables a user to easily hold and maintain the transmitter including but not limited to during use of the system 100.

As shown in FIGS. 14 through 17, some preferred exemplary embodiments of an exemplary power washing device 400 comprise a gas or electric powered motor 410 connected to at least one pump 415, said pump 415 having an inlet that receives water from a water supply. The motor 410 may be connected to the pump 415 via a driver pulley 420 and a driven pulley 425 that are connected by at least one belt 430. Though not shown in FIGS. 14 through 17, the motor 410 could be and preferably is connected to receiver 200 via at least one electrical wire connected to both the motor 410 (in some embodiments the wire is received at the receiver 200 by wire harness 220). An outlet within the pump 415 is connected to the first end of a high-pressure hose. When power is supplied to the motor 410, the pump 415 may be operated causing water to flow from the water supply, through the inlet of the pump 415 and then out of the pump 415 via the outlet into the first end of the high-pressure hose. The second end of the high-pressure hose may be directly or indirectly connected to a handheld wand (perhaps as part of a spray gun) having an outlet for passing a high-pressure spray of water when the device is in operation. Various nozzles may be affixed to the wand. A handle connected to the wand and/or which is part of a spray gun may permit for the user to selectively permit for the high-pressure flow of water to be emitted from the wand.

Figure 15:
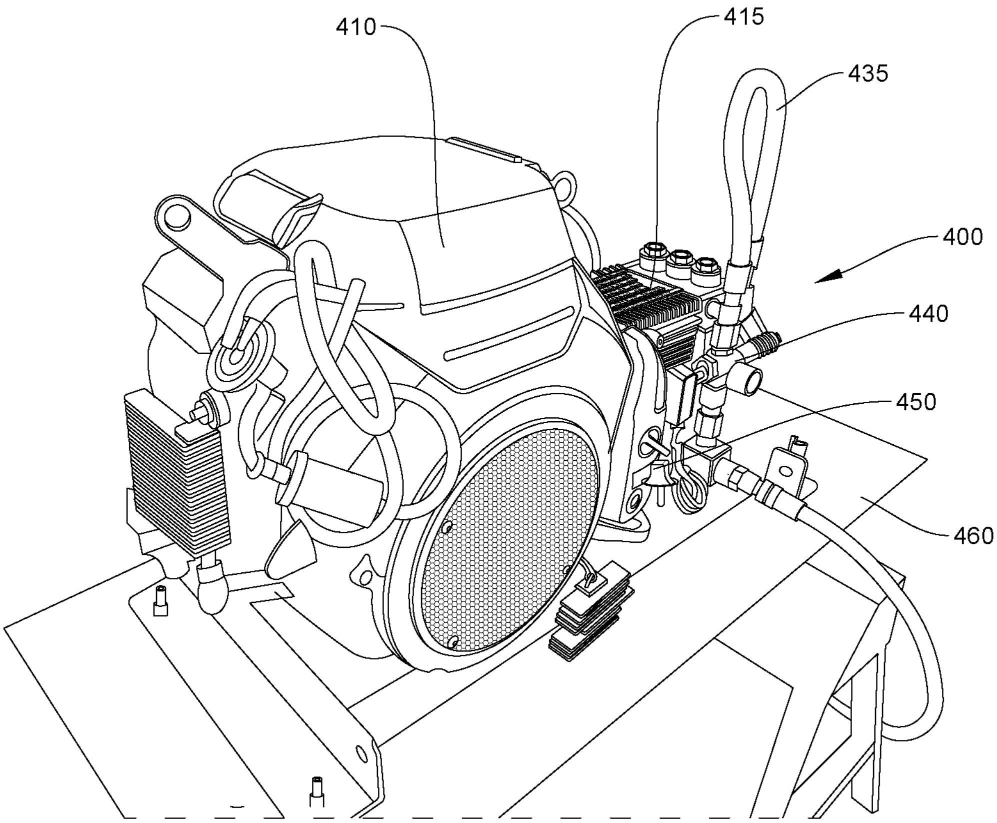
FIG. 15 shows a left-side perspective view of the exemplary embodiment shown in FIG. 14.
Figure 16:
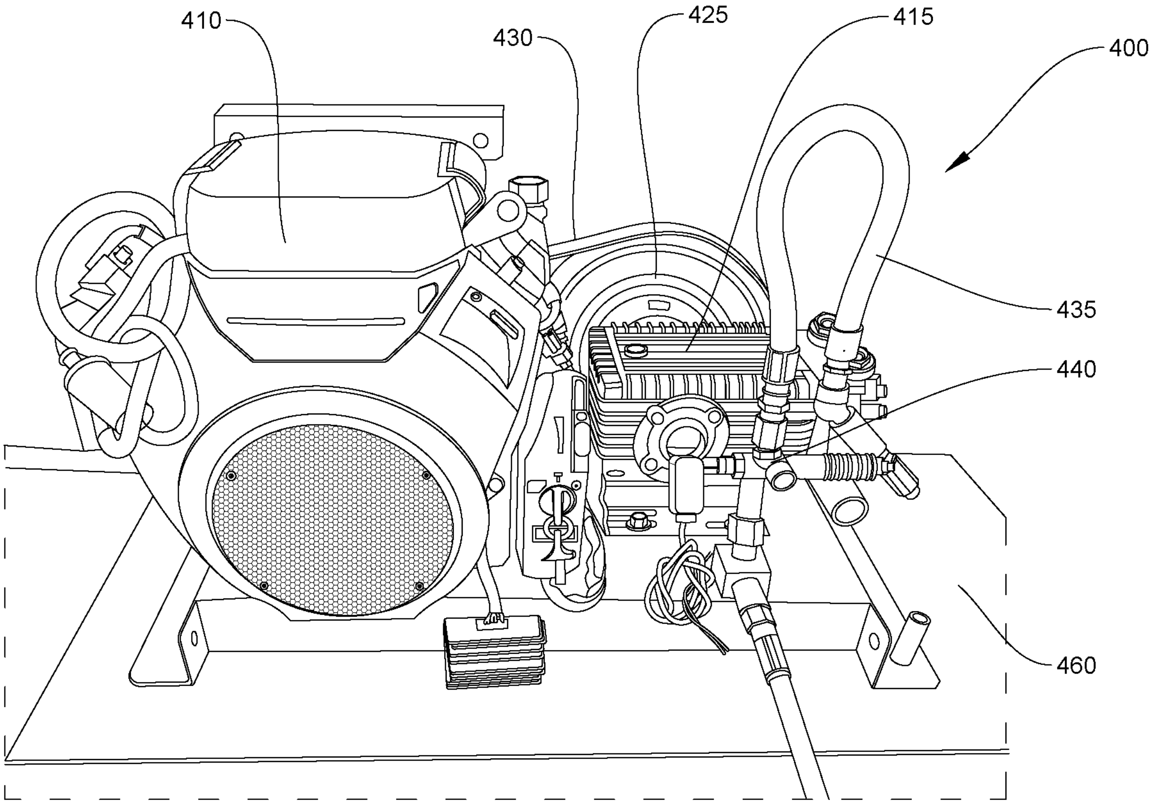
FIG. 16 shows a left-side view of the exemplary embodiment shown in FIG. 14.
Figure 17:
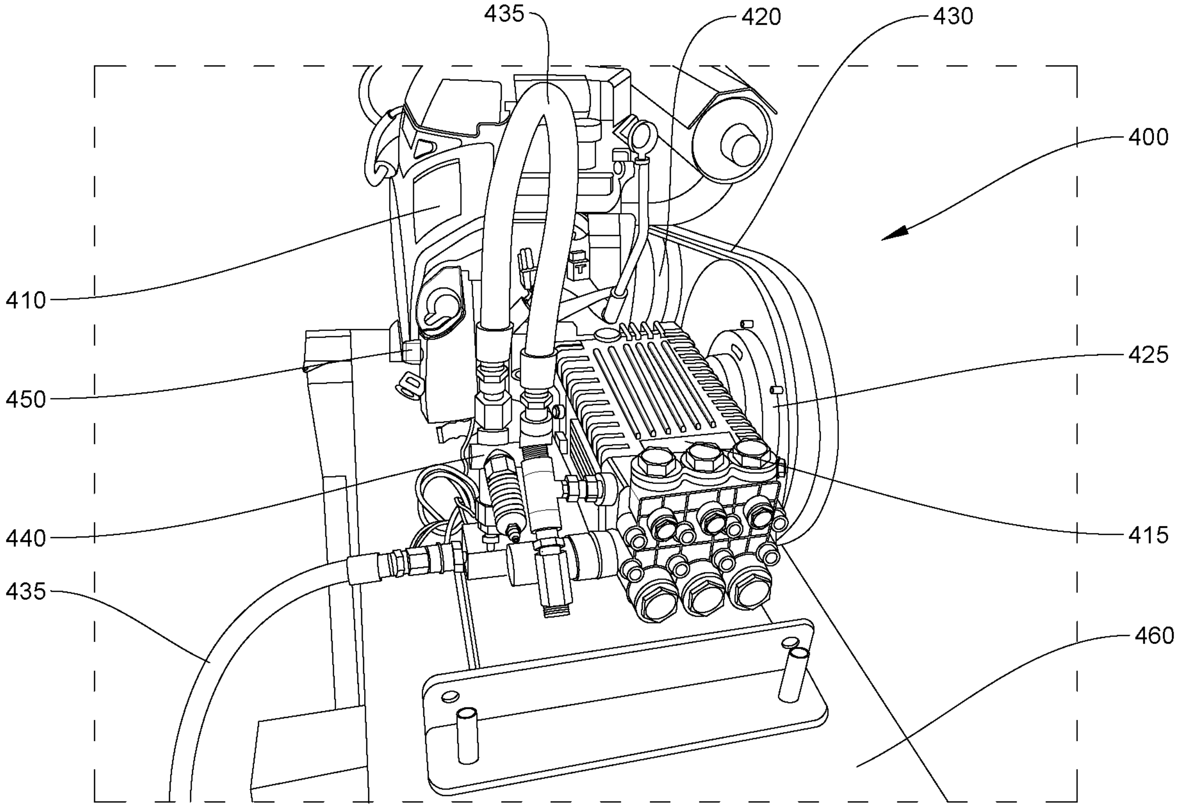
FIG. 17 shows a front perspective view of the exemplary embodiment shown in FIG. 14.

In exemplary embodiments such as those shown in FIGS. 1-20, the motor 410 of the power washer device can be operated remotely using a hand-held transmitter 300. An exemplary transmitter 300 is shown in FIGS. 7 through 11. The transmitter 300 may be battery operated in some embodiments. In the preferred exemplary embodiment, a computerized receiver 200 electronically connected to or integrated into the motor 410 is adapted to receive signals from the hand-held transmitter 300 that enables the motor 410 to be powered on and off remotely. An exemplary receiver is shown in FIGS. 1 through 6 as has been discussed. The exemplary embodiments of a power washer device shown in FIGS. 14 through 20 may utilize a commercially available motor 410 that has been modified including to comprise, or be electronically connected to, an exemplary receiver 200 as discussed herein. In a preferred exemplary embodiment, the motor 410 comprises a power supply which powers the computer 200 connected to or integrated into the motor 410. Such exemplary embodiments may implement a motor key 450, such as shown in FIG. 15, which must be inserted into the motor 410 and placed in an on position for the computer/receiver 200 to be supplied with energy. As shown in FIGS. 14 through 20, the motor 410 is connected to at least one pump 415 which can be operated when power is being supplied to the motor 410. An exemplary belt and pulley configuration that may be utilized to form an indirect connection between a motor 410 and pump 415 can be seen in FIGS. 14 through 17. Direct connections between the motor 410 and pump 415 may be utilized in some embodiments. Note that FIGS. 14 through 17 do not show the connection of the pump 415 to the water source, or the connection of the high-pressure hose 435 to the spray gun which would be used in many exemplary embodiments.

In a preferred exemplary embodiment, the power that is supplied to the motor 410 can be varied using at least the handheld transmitter 300. In such embodiments, preferably the more power that is supplied to the motor 410, the more quickly the motor 410 rotates increasing the pump speed and the flow rating of the water as it travels through the outlet of the pump 415 and into the hose 435. Conversely, reducing the voltage supplied to the motor 410 preferably reduces the rotation speed of the motor 410 and decreases the speed of the pump 415 causing a reduction in the flow rating of water as is travels through the outlet of the pump 415 and the high-pressure hose 435. In such an embodiment, a single motor 410 and at least one pump 415 are capable of supplying output streams of water that vary meaningfully in terms of their flow ratings without the user having to physically approach the motor 410 or change machines. In some preferred embodiments, the power washer has only a single motor 410. In some preferred embodiments, the power washer has only a single pump 415.

Preferably, the hand-held transmitter 300 has a first push button 310 for powering the motor 410 on and off, a second push button 311 for activating a water flow rate selection, as well as at least one more push button 312, 313, or 314 for actuating and deactivating at least one accessory (i.e. soap, heat, etc.). In such an embodiment, selecting a push-button 310 on the transmitter 300 may send a signal to the computer-receiver 200 which causes the motor 410 to be turned on. In some embodiments, when this occurs, the pump may initiate at the last speed (and hence the device will provide the water flow rate) that had last been utilized. If a different motor speed/water flow rate is needed or desired, transmitter 300 can preferably be utilized to change the motor speed/flow rate. The user may set the selector 315 to the setting that corresponds to the desired water flow rate. Preferably, the user may then select button 310 to activate the flow rate to the selected flow rate.

In some exemplary embodiments, powering on the motor 410 may not automatically actuate the pump 415. In such embodiments, transmitter 300 may comprise a button (i.e. 312, 313, or 314) to separately actuate and deactivate the pump 415. In these embodiments, engaging the relevant push-button (i.e. 312, 313, or 314) on the transmitter 300 after the motor has been powered on may cause the pump 415 to be actuated which generates a flow of water out of the pump 415 (assuming the pump 415 is supplied with water via a water source as would be expected during operation) until the same push button on the transmitter 300 is pushed again causing the pump 415 to be deactivated and ceasing the flow of water out of the pump 415. The pump 415 may receive water from an inlet connected to at least one water tank, a hose, etc.

In some exemplary embodiments, the transmitter 300 comprises push buttons (i.e. 312, 313, or 314) that are associated with engaging and disengaging additional accessories. For example, one device may be adapted to supply soap and heated water by selecting at least two different push buttons on the transmitter. In some exemplary embodiments, as shown in the embodiments of FIGS. 1 through 17, a single button (or switch or dial) on transmitter 300 may power both the motor 410 and pump 415 of a device for power washing that is electronically connected to the receiver 200.

Some embodiments comprise a push-button on a handheld transmitter 300 that causes the generation of a radio wave signal which is sent to a receiver 200 in electronic communication with the starter of a motor 410. When the "on" signal is received by the receiver 200 in such embodiments, it may engage the starter of the motor 410 which will cause the motor 410 to turn on. In some embodiments, the computer 200 monitors whether the motor 410 turns on after the receipt of the "on" signal. If the computer 200 detects that the motor 410 does not turn on within a predetermined time period after receipt of the "on" signal, within a predetermined time period of communicating with the starter, etc. the computer 200 will disengage the starter to prevent the starter from burning itself out. Such embodiments may implement a timer, such as a 555 timer, within receiver 200, to turn the power supply off to the starter after a predetermined period of time. In such exemplary embodiments, a pressure switch ground may detect when the motor has started and terminate the timer before it finishes its cycle and causing the power to the motor 410 starter to be shut off. Exemplary wiring for such an exemplary embodiment is provided in FIGS. 12(*a*) and 12(*b*).

Some exemplary embodiments comprise an LED on the transmitter 300 and/or an LED on the receiver 200 that lights up when the motor 410 is successfully turned on. Such exemplary embodiments may also comprise a second LED on the transmitter 300 and/or receiver 200 which emits light if the motor 410 does not turn on after a push-button 310 or 210 corresponding to motor power has been selected by a user. In some exemplary embodiments, the transmitter 300 and/or receiver 200 may comprise at least one color-changing LED that emits a first color to signal that the motor has been turned on and a second color to signal that the motor 410 was not successfully turned on after a push-button corresponding to motor 410 power has been selected by a user.

In some exemplary embodiments, after the motor 410 has been powered on and the pump 415 has been actuated, when utilization of the device is no longer desired, the entire device may be turned off (i.e. the pump is deactivated and the motor is powered off) by selecting a single push button (i.e. 310 or 210) on the transmitter 300 or the receiver 200.

In some exemplary embodiments, a remote-control operated power washer 400 comprises at least one control dial 215 on the receiver 200 which may be set in a first position (a setting) when it is desired that the power washer 400 be operated via a handheld transmitter 300 that is in communication with the receiver 200 and may be set in another position when it is desired that the power washer 400 not be operated by the handheld receiver 300 and instead be operated manually via at least one button on the receiver 200. When the transmitter bypass selector is integrated with the water flow rate selector 215, each of the water flow rate settings may be a position which indicates the transmitter 300 may be used to control a device for power washing that is connected to receiver 200. Some embodiments may comprise a control switch instead of a control dial 215 wherein the control switch has a first position the selection of which indicates whether or not the handheld transmitter 300 may be used to operate the power washer device or whether the device should be controlled manually via at least one button and/or dial on the receiver 200. In a preferred exemplary embodiment, the transmitter bypass selector is part of flow rate selector 215 on the receiver 200 that also may be utilized to vary the voltage that is supplied to the motor 410. In such an embodiment, the dial 215 may be placed into a first position (i.e. by turning it in a first direction) which indicates that only the handheld transmitter 300 will be used to operate/provide instructions to the device 400. In such exemplary embodiments, turning the dial 215 the opposite direction and taking it out of the first position, thus indicating that the handheld transmitter 300 will not be utilized to operate the device 400, enables the dial 215 on the receiver 200 to be utilized to set (increase and decrease) the voltage that will be supplied to the motor 410.

In some exemplary embodiments, both transmitter 300 and receiver 200 have a transmitter bypass selector. In other exemplary embodiments, only one of the group consisting of the transmitter 300 and receiver 200 have a transmitter bypass selector (in such embodiments, preferably the transmitter bypass selector is on the receiver 200).

As discussed, some exemplary embodiments comprise at least one push button associated with the pump 415 for actuating and deactivating a pump 415. One of the accessory buttons (i.e. 212, 213, or 214) on the receiver 200 and an accessory button (i.e. 312, 313, or 314) on the transmitter 300 may be associated with at least actuating pump 415. In some exemplary embodiments, selecting at least one push button associated with the pump 415 will actuate or deactivate the pump clutch (selecting the push button when the pump clutch is not already actuated would cause actuation of the pump clutch). In a preferred embodiment, both the transmitter 300 and receiver 200 comprise a push button for actuating and deactivating the pump 415/pump clutch. Such embodiments may also comprise a transmitter bypass selector (it may be integral with selector 215) such that placing the bypass selector in a first position dictates whether the push button on the handheld transmitter 300 or the push button on the receiver 200 controls the pump 415.

As discussed, some exemplary embodiments comprise at least one push button (i.e. 312, 313, 314, 212, 213, 214) for actuating and deactivating an accessory such as heated water or soap. Some exemplary embodiments comprise a push button (i.e. 312, 313, or 314) associated with at least one accessory on a handheld transmitter 300 and a push button (i.e. 212, 213, or 214) associated with the same accessory on the receiver 200. Which push button actually controls operation of the accessory may be dictated by the position of a control dial 215 or control switch that acts as a transmitter bypass selector. In some exemplary embodiments, selecting a push button associated with the accessory supplies power to or disengages power that was being supplied to the accessory via a port (221, 222, or 223) on the receiver 200. The port 221, 222, or 223 is preferably adapted to receive at least one electrical wire which is in electric communication with the accessory.

In some embodiments, the transmitter 300 may comprise a water flow rate selector 315 that comprises a dial which may be turned clockwise and counterclockwise to send signals to the computer 200 that vary the voltage supplied to the motor 410. Turning the dial 315 one direction (i.e. clockwise) may send a signal to the computer/receiver 200 causing the voltage supplied to the motor 410 to be increased up to a certain maximum amount, while turning the dial 315 in the opposite direction (i.e. counterclockwise) may send a distinct signal to the computer/receiver 200 causing the voltage being supplied to the motor 410 to be decreased down to some minimum value. In these exemplary embodiments, the speed of the motor 410 is proportionally related to the voltage being supplied to it.

Figure 12A:
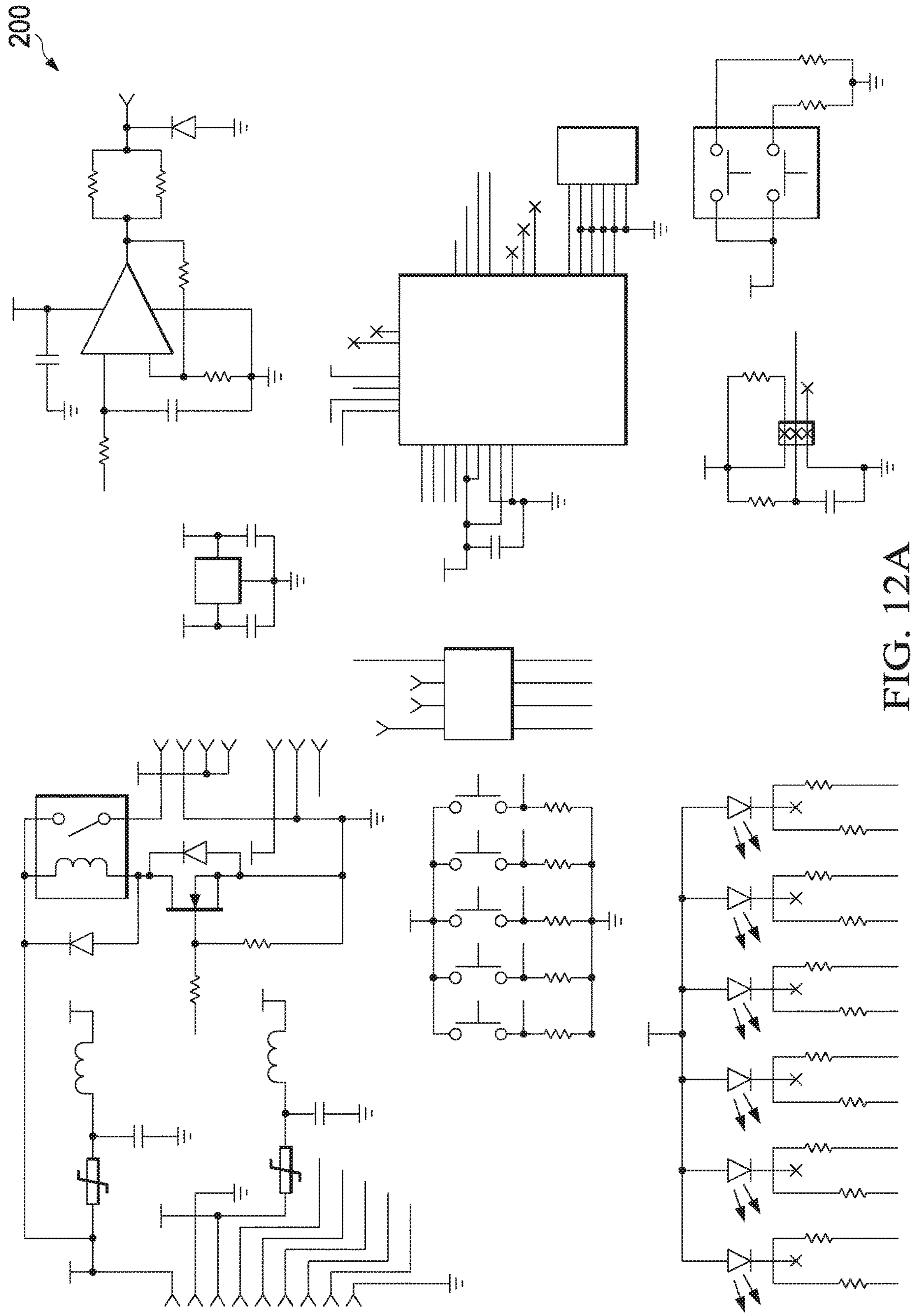
FIG. 12 shows an exemplary wiring schematic corresponding to the exemplary receiver shown in FIGS. 1 through 6 wherein the wiring schematic has been separated into FIGS. 12(*a*) and 12(*b*) due to size.
Figure 12B:
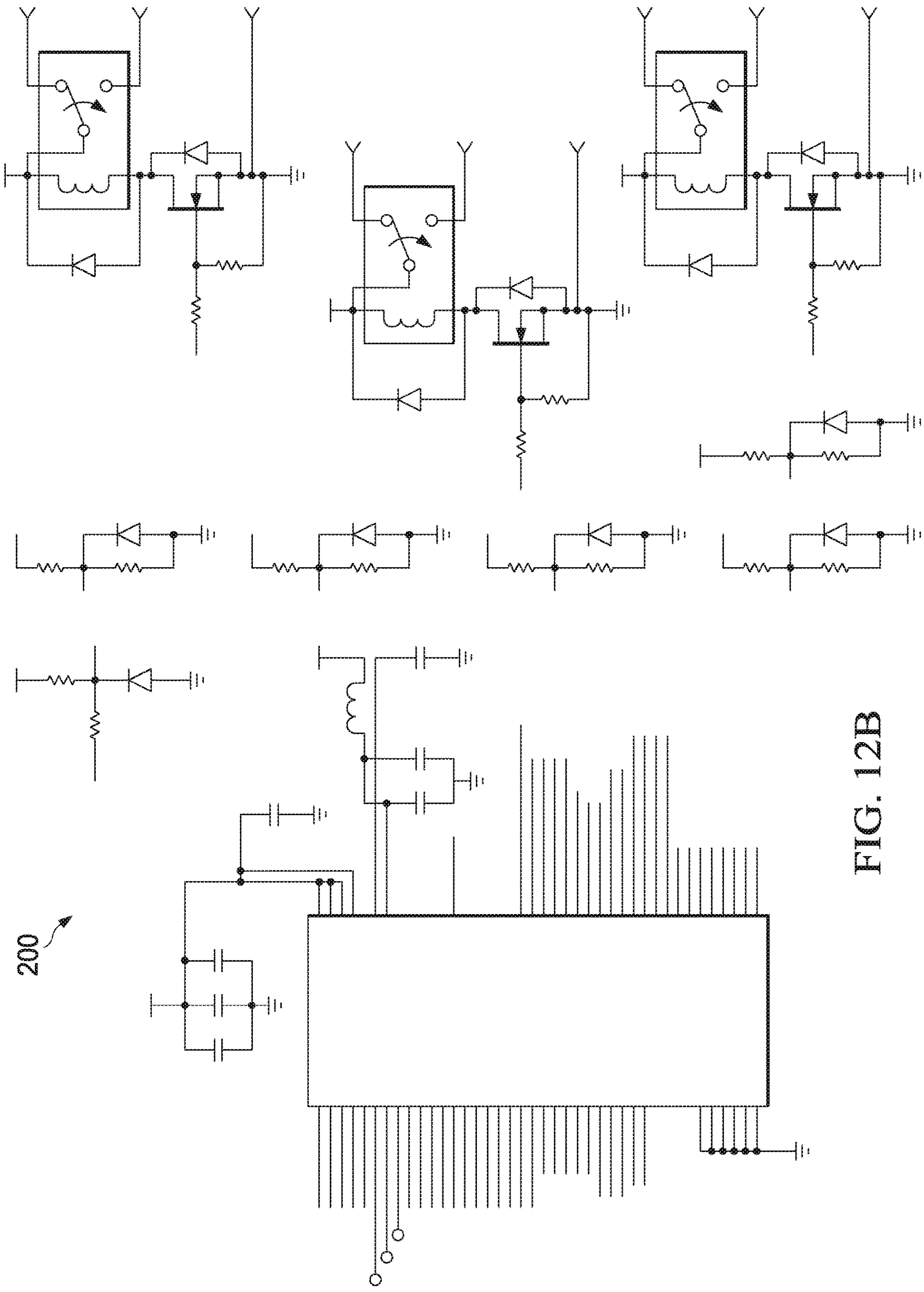
Figure 13:
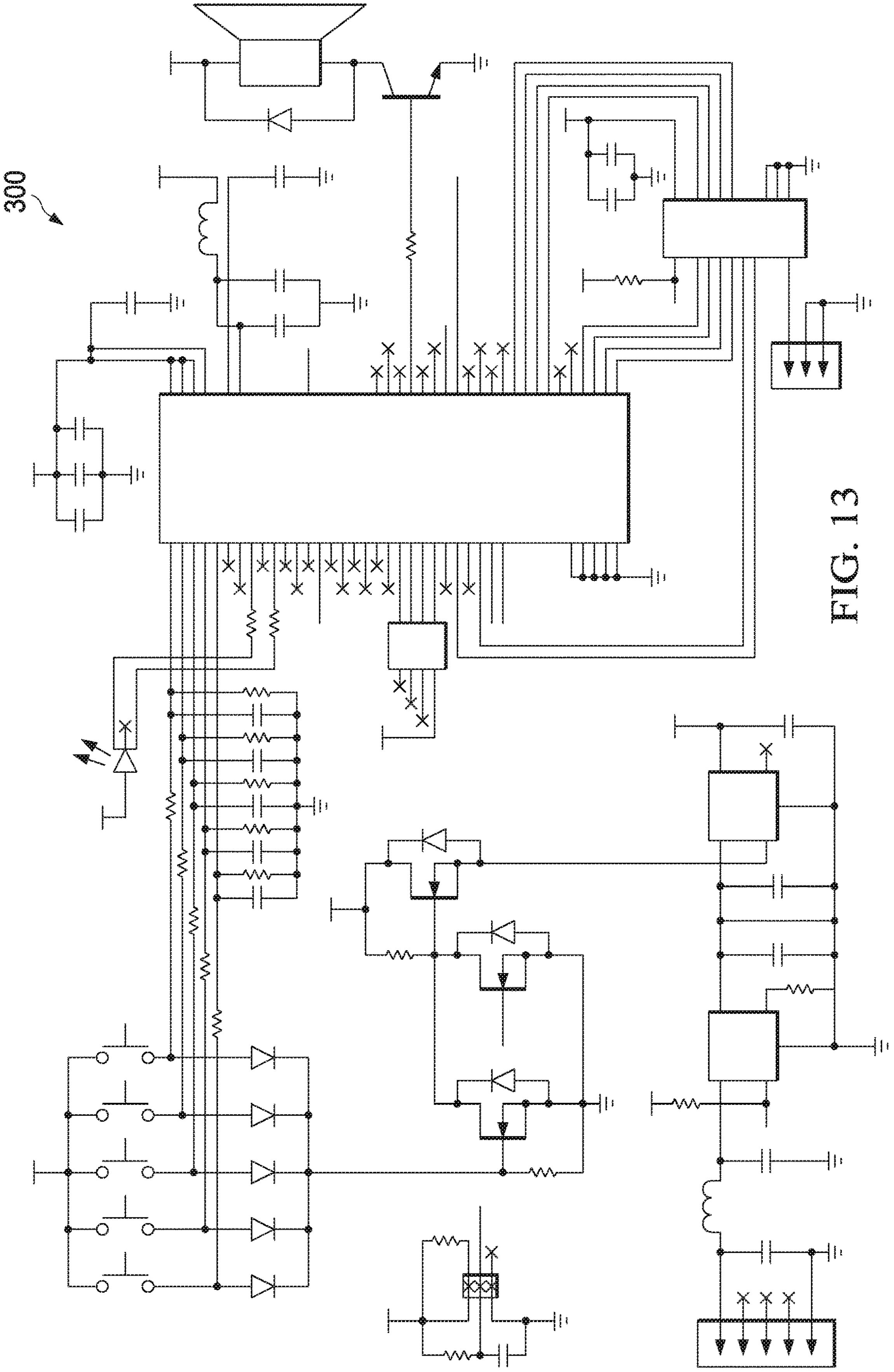
FIG. 13 shows an exemplary wiring schematic corresponding to the exemplary transmitter shown in FIGS. 7 through 11.
Figure 14:
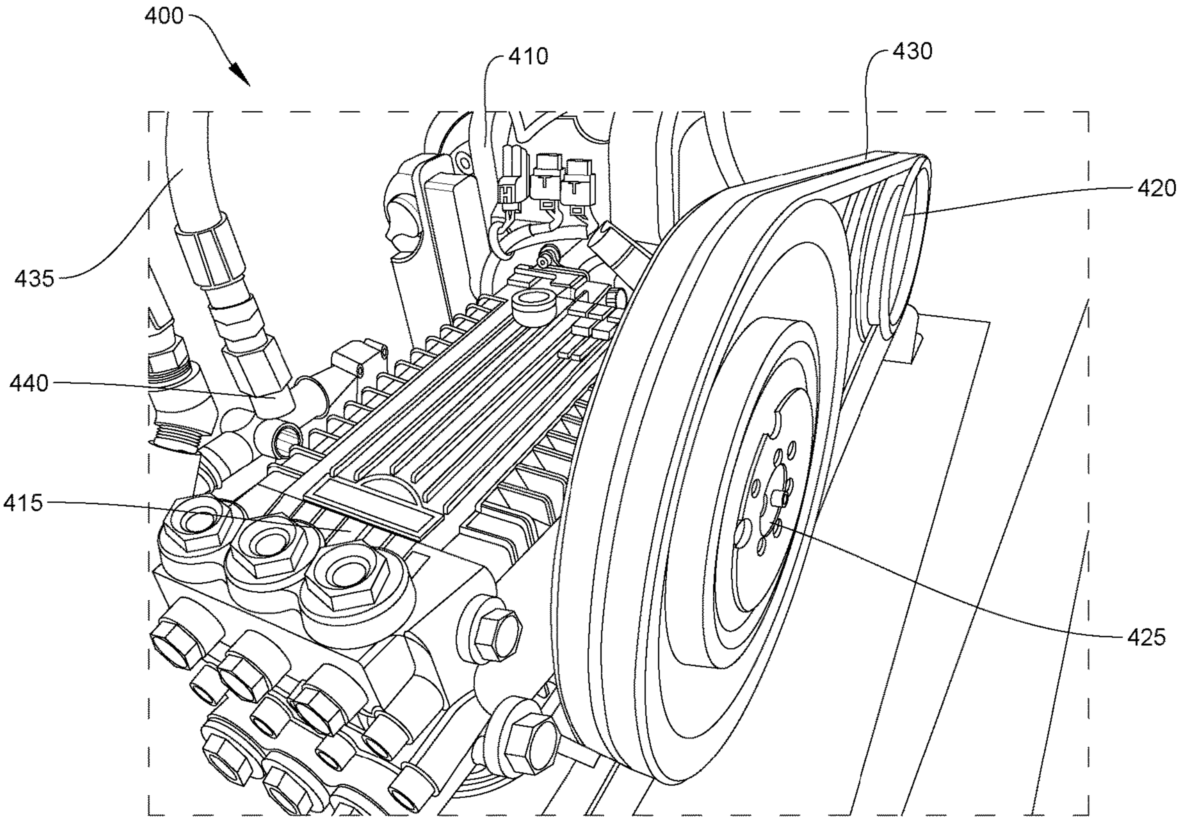
FIG. 14 shows a right-side perspective view of an exemplary embodiment of a device for power washing of the present invention having a single pump.

In a preferred exemplary embodiment, which is depicted by the exemplary wiring schematics shown in FIGS. 12 and 13, the position of a water flow rate selector comprising a dial (i.e. 315, 215) on the transmitter 300 and/or receiver 200 can control which circuit out of a variety of circuits is utilized to supply voltage to the motor 410. As shown in FIGS. 2 and 7, the water flow rate selectors 215, 315 each provide for four different water flow rate selections. In the embodiment shown, each of the selectors 215, 315 has one setting that corresponds to a different function (i.e. the transmitter bypass selector). In some exemplary embodiments, a water flow rate selector will only have settings that correspond to water flow rates that can be selected by a user. In a preferred exemplary embodiment, each of the water flow rate settings corresponds to a circuit that can be utilized to provide power to motor 410. Each one of the various circuits preferably has a different level of electronic resistance. When the power is supplied to the motor 410 using circuits having greater resistance, the voltage received by the motor 410 is reduced. Contrarily, when circuits having lesser resistance are utilized to supply power to the motor 410, the voltage received by the motor 410 is greater. In this manner, the power supplied to the motor 410, and hence the speed of the motor 410, can be increased and decreased by changing the position of the one or more dials 215, 315.

In addition to having push-buttons on the transmitter 300 that enable remote powering on and off the motor 410 and actuation and deactivation of the at least one pump 415 and at least one accessory, some exemplary embodiments comprise push-buttons 210, 211, 212, 213, 214 on the receiver 200 (i.e. the computer connected to or integrated into the motor 410) so that the motor 410 can be powered on and off, selected flow rates can be set, and at least one accessory can be actuated and deactivated without the transmitter 300. The receiver 200 may also comprise a flow rate selector 215 which comprises various water flow rate settings (preferably 4) permitting for the voltage being supplied to the motor 410 and hence the water flow rate output by the connected pump to be varied between four different flow rates. In the preferred exemplary embodiment, button 211 must be pushed after using the flow rate selector 215 in order to activate the water flow rate of a connected device for power washing to a newly selected flow rate.

An exemplary embodiment as shown in FIGS. 14 through 17 is a computer-controlled power washer 400 comprising a handheld transmitter 300 that is adapted to generate and sends signals to a receiver 200 that is electronically connected to a motor 410 which is in turn connected to at least one pump 415 having an inlet and outlet. The pump inlet receives water from a water source which may be a refillable tank of water. The transmitter 300 and receiver 200 preferably each have a push button (310, 210 respectively) that may be utilized to start the motor 410 such that the motor 410 and pump 415 can be started remotely (via the corresponding button 310 on the transmitter 300) as well as manually (via the corresponding button 210 on the receiver 200). The transmitter 300 and receiver 200 may also each comprise a button (311 and 211 respectively) for activating the water flow rate as well as at least one button (312, 313, 314, 212, 213, 214) for actuating and deactivating an accessory for power washing. There may be a transmitter bypass selector (that may be integral with selector 215) on the receiver 200 which controls whether the power washer device 400 can be operated via the handheld transmitter 300.

In a preferred exemplary embodiment, a device for power washing 400 comprises a motor 410 that may be remotely operated using a hand-held transmitter 300 that wirelessly communicates with a receiver 200 that is connected via at least one wire with the motor 410. The transmitter 300 may comprise a first push button 310 for powering the motor 410 on and off, a second push button 311 for activating the water flow rate output by a device for power washing that is electronically connected to receiver 200, and a third push button 313 for engaging and disengaging an accessory that is electronically connected with the receiver 200 via at least one wire (that may be received by a port 223) on the receiver 200. The accessory may be a water heater, a soap dispenser, etc. The transmitter 300 preferably comprises a flow rate selector 315 comprising a dial the rotation of which in a first direction causes the voltage being supplied to the motor 410 to increase and the rotation of which in a second direction causes the voltage being supplied to the motor 410 to decrease. Increasing the voltage being supplied to the motor 410 causes the speed of the motor 410 to increase while decreasing the voltage being supplied to the motor 410 causes the speed of the motor 410 to decrease. Preferably, the flow rate selector 315 comprises four different flow rate settings. In the preferred exemplary embodiment, a flow rate setting can be selected using the flow rate selector 315 and the selection will be communicated to the receiver 200 when button 311 is pushed. The receiver 200 in this embodiment decodes the message and causes power to be sent to the electronic circuit that corresponds to the selected flow rate. The speed of the pump 415 increases when the speed of the connected motor 410 increases and the speed of the pump 415 decreases when the speed of the connected motor 410 decreases. The connection of the pump 415 to the motor 410 can be direct in some embodiments and indirect in other embodiments. Indirect connections may utilize at least one belt to form the connection between the pump 415 and motor 410. Thus, the device comprising system 100 enables wireless pump flow adjustment wherein the flow rate can be increased and decreased within a relatively broad range (i.e. from 5 gallons per minute up to 12 gallons per minute) using a single device for power washing. The preferred exemplary embodiment has the ability to produce the same flow rating as a 12 gallon per minute machine of the prior art, a 10 gallon per minute machine of the prior art, an 8 gallon per minute machine of the prior art, a 6 gallon per minute machine of the prior art, and a 5.5 gallon per minute machine of the prior art and can be adjusted between these flow ratings remotely and nearly instantaneously. This permits for the replacement of multiple power washers which would otherwise be needed to provide for the same flow rate range increasing fuel and working efficiency and decreasing the amount of space that would be necessary to store and transport the multiple machines.

The receiver 200 in the preferred exemplary embodiment also comprises a first push button 210 for powering the motor 410 on and off, a second push button 211 for activating the water flow rate, and a third push button 213 for actuating and deactivating an accessory that is electronically connected with the receiver 200 via at least one port 223 on the receiver 200. The receiver 200 additionally preferably comprises a transmitter bypass selector which may be integrated with a flow rate selector 215 that permits for the voltage being supplied to the motor 410 to be increased or decreased. The transmitter bypass selector preferably permits for a user to indicate whether or not the transmitter 300 may be utilized to control the operation of the device 400. In this preferred exemplary embodiment, the device 400 is preferably approximately the same size as a single power washer device of the prior art. Accordingly, there is a great space savings accomplished by using one device for power washing that may produce water outputs of various flow ratings as described.

Some exemplary embodiments may comprise an automatic idle up or down as required on demand to increase fuel efficiency and mechanical wear and tear on the machine. As can be seen in the exemplary wiring schematic of FIGS. 12 and 13, in one exemplary embodiment, when the pressure switch 440 detects water pressure of a certain amount (i.e. when the hose/spray gun is not being used to release water and pressure builds up inside the hose 435 and at the pressure switch 440), it causes the power to the pump 415 to be shut off. When that occurs in such embodiments, the power that would have gone to the pump 415 may go back to the computer 200 opening and closing a series of relays comprising a first timer and a second timer. With respect to the first timer, if power is detected at the relays for a set period of time, the system will preferably cause the amount of power supplied to the motor 410 to be reduced placing the motor 410 in an idle state. With respect to the second timer, if power is detected at the relays for a set period of time (which is longer than the amount of time measured at the first timer), the system will cause the motor 410 to be turned off completely. The first timer and second timer may comprise a 555 timer housed in receiver 200 in some embodiments.

The exemplary embodiments comprising an automatic idle up or down preferably comprise an automatic restart of the motor 410 when the trigger of a connected spray gun is pushed with at least a certain amount of pressure. Preferably, this causes power to be directed back to the motor switch which sends power to the pump 415, thereby starting the motor 410 and pump 415. Preferably, the motor 410 starts first. A timer, which may be a 555 timer in some embodiments, may be utilized to start the pump 415 after the motor 410 has been started. In such an exemplary embodiment, an open switch may be utilized within receiver 200 to prevent power from going to the pump 415 at the same time the motor 410 start is engaged. The switch may be closed when the timer finishes its series and once the switch is closed, power may flow to the pump 415 causing it to actuate. Such an exemplary embodiment is depicted in the exemplary wiring schematic of FIG. 11.

Some exemplary embodiments comprise an automatic economy mode in which after the machine 400 comprising system 100 has been running for a certain period of time without use (i.e. without water being dispensed from a connected wand/spray gun, etc.) the machine 400 will automatically shut down until the spray gun is subsequently squeezed. Upon squeezing of the spray gun, etc. the motor 410 will automatically restart and the machine 400 will resume function as it was prior to shutting down. Such an exemplary embodiment is depicted in the exemplary wiring schematic of FIG. 11.

In an exemplary embodiment, when the pump 415 has been actuated but no water is being dispensed (i.e. no one is spraying a connected spray gun, etc.) the computer 200 will deactivate the pump 415 to eliminate the risk of overheating and to remove unnecessary strain and wear and tear on both the motor 410 and the pump 415. Once a connected spray gun is squeezed and work is resumed, the computer 200 will actuate the pump 415 and resume previous function. Such an exemplary embodiment is depicted in the exemplary wiring schematic of FIG. 11.

Figure 18:
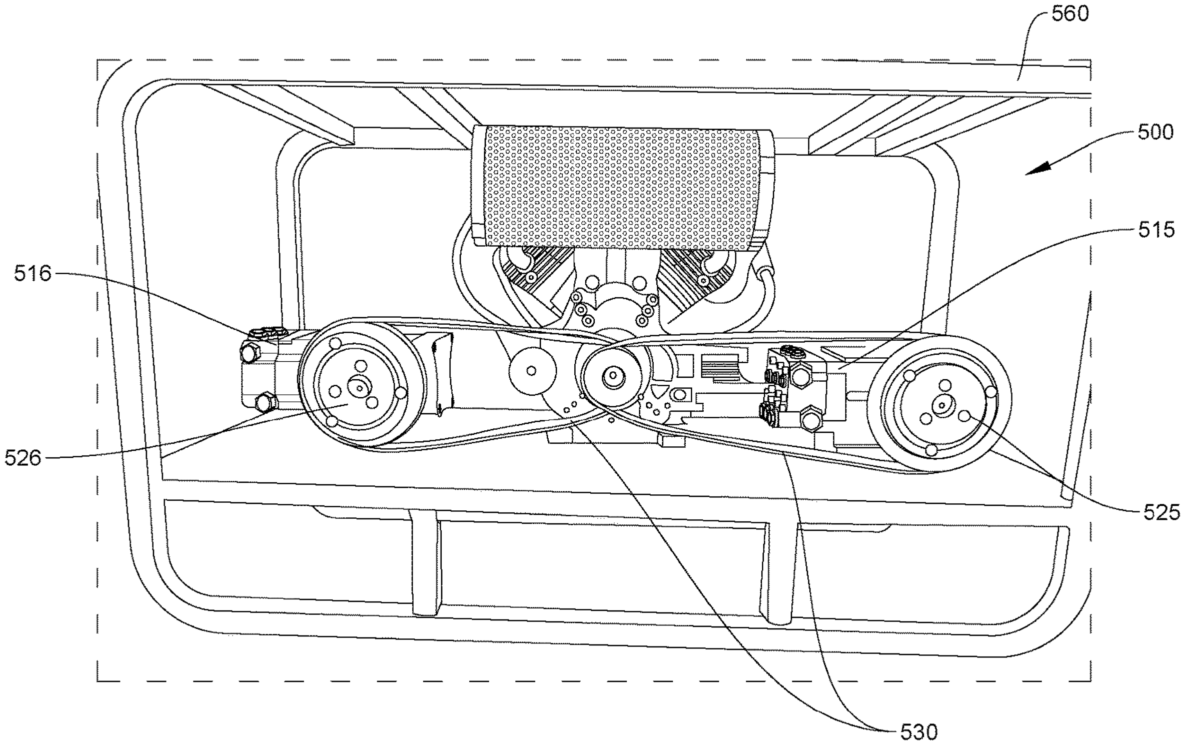
FIG. 18 shows a right-side view of a second exemplary device for power washing, this embodiment comprising a first pump and a second pump.
Figure 19:
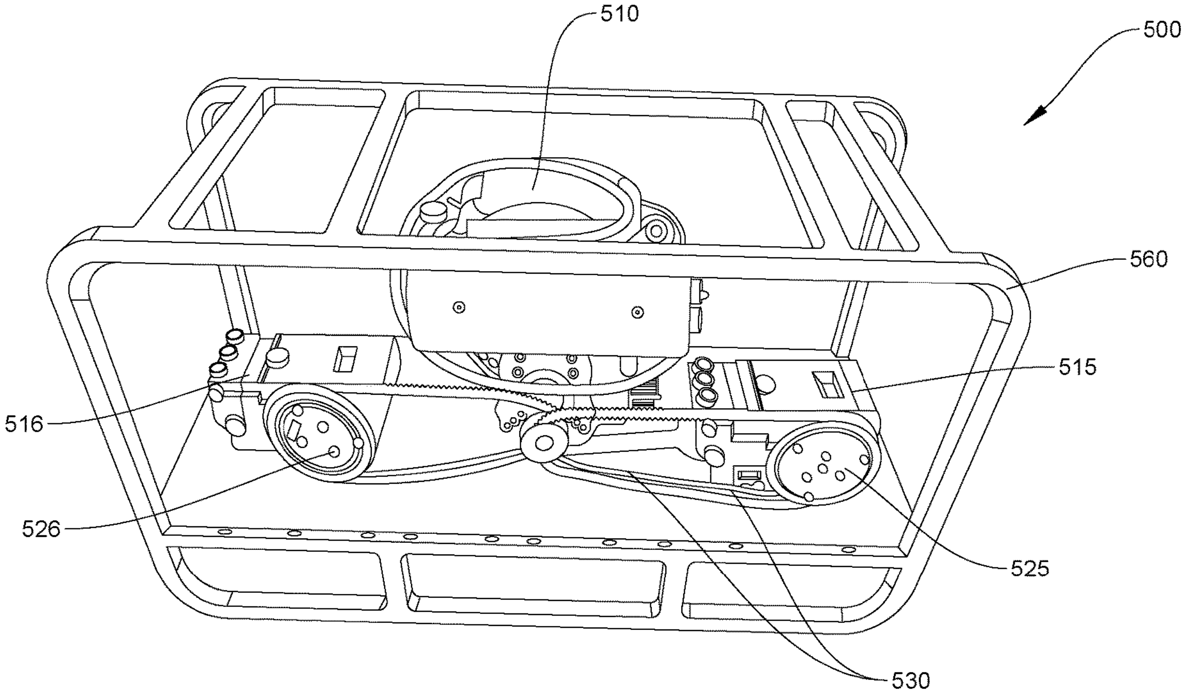
FIG. 19 shows a right-side perspective view of the exemplary embodiment shown in FIG. 18.
Figure 20:
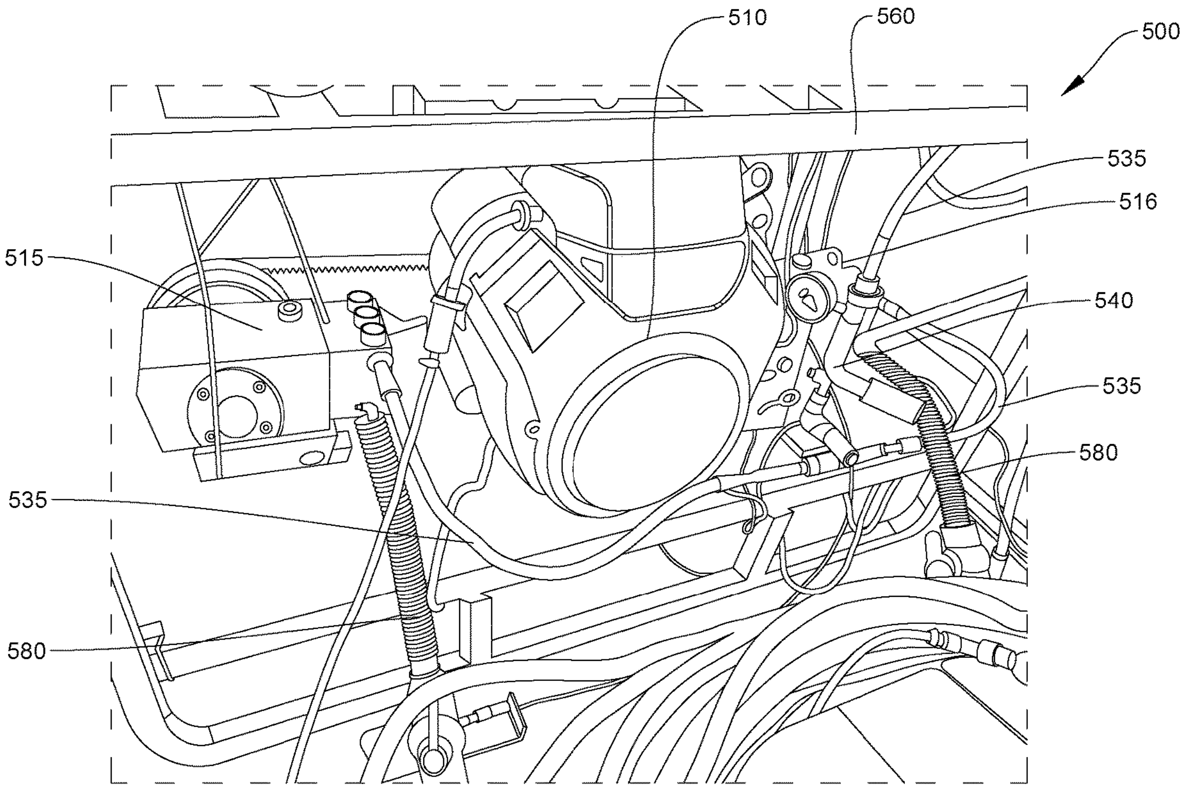
FIG. 20 shows a left-side perspective view of the exemplary embodiment shown in FIG. 18.

In another exemplary embodiment such as is shown in FIGS. 18 through 20, a remote-control operated device for power washing 500 comprises a motor 510 that is connected to or which has an integrated computer 200 that receives signals from a hand-held transmitter 300. The received signals enable the motor 510 to be remotely powered on and off. The motor 510 is connected to a first pump 515 and a second pump 516 which are both in connectivity with a water source and a high-pressure hose 535. After the motor 510 is remotely powered on, the transmitter 300 can be used to send a signal to the computer 200 actuating the first pump 515 and causing a flow of water to be generated out of the pump 515 and into the hose 535. If a higher psi of water is needed, the transmitter 300 can be used to send a signal to the computer 200 causing the second pump 516 to be actuated. Using the two pumps 515, 516 at once causes greater water flow through the hose 535 and thus a greater psi of water flow through and out of the hose 535. Preferably, at least one push button on the transmitter 300 permits for the first 515 and second pumps 516 to be selectively deactivated when a lesser psi or no water flow is desired. As shown in FIG. 20, the pumps 515, 516 of a device for power washing 500 may be connected to a water source by at least one hose 580.

In some exemplary embodiments, a device for power washing of the present invention comprises at least one stand 460, 560 which supports a base to which a motor and at least one pump are physically secured. An exemplary stand may be seen in FIGS. 15, 16, 18, 19, and 20. The stand and base may be made out of aluminum in some embodiments.

Note that the exemplary wiring schematics of FIGS. 12 and 13 show one exemplary way in which the exemplary system 100, and devices comprising an exemplary receiver 200 and exemplary transmitter 300, may be wired. In some embodiments, other wiring may be implemented to obtain the claimed system and device.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A device for power washing comprising:

a gas-powered motor comprising a camshaft;

a pump connected to the motor;

a radio wave transmitter comprising:

a water flow rate selector which provides for selecting between at least two different water flow rate settings;

a first button that corresponds to at least the starting and stopping of the motor; and a second button that corresponds to activating a water flow rate after a water flow rate setting has been chosen using the water flow rate selector;

a receiver comprising a processor, a wire harness, and at least two circuits each having a different electric resistance, wherein:

the processor is operatively connected to the radio wave transmitter and configured to received and decode radio waves emitted therefrom;

the processor is operatively connected to the motor by at least one wire received by the wire harness such that the motor can be electronically controlled by the transmitter; and each circuit of the at least two circuits is configured to supply voltage to the motor;

a camshaft position sensor operatively connected to the processor of the receiver; and a pressure sensor configured to monitor the water pressure output by the pump, wherein the pressure sensor is operatively connected to the processor of the receiver;

wherein the receiver is configured to automatically vary which circuit is used to supply voltage to the motor in response to the pressure sensor detecting water pressure at a predetermined amount, thereby automatically idling up or down the motor and changing the water pressure output by the pump;

wherein the motor is adapted to rotate at different speeds depending on which water flow rate setting is selected on the transmitter's water flow rate selector and set by the second button.

2. The device of claim 1, wherein the water flow rate selector comprises a dial.

3. The device of claim 2 wherein the water flow rate selector provides for selecting between at least 4 different water flow rate settings.

4. The device of claim 1 further comprising at least one belt utilized to connect the pump to the motor such that the pump is indirectly connected to the motor.

5. The device of claim 1 further comprising:

an accessory for power washing electronically connected to the receiver;

the receiver further comprising a third button corresponding to the actuation and deactivation of the accessory.

6. The device of claim 1 further comprising:

an accessory for power washing;

a third button on the transmitter corresponding to the accessory for power washing; and an accessory port on the receiver;

wherein the accessory for power washing is electronically connected to the receiver by at least one wire received by the accessory port such that the accessory can be electronically controlled using the third button on the transmitter.

7. The device of claim 6 wherein the accessory comprises a soap dispenser.

8. The device of claim 6 wherein the accessory comprises a water heater.

9. The device of claim 1 wherein the receiver further comprises:

a transmitter bypass selector wherein the transmitter bypass selector can be selected in order to control the speed of the motor at the receiver instead of using the transmitter and wherein the water flow rate selector comprises at least two different water flow rate settings.

10. The device of claim 9 wherein the transmitter bypass selector is integral with the water flow rate selector on the receiver.

11. A device for power washing comprising:

a gas-powered motor comprising a camshaft;

motor comprising a camshaft;

a pump connected to the motor;

a radio wave transmitter comprising:

a water flow rate selector which provides for selecting between at least two different water flow rate settings; and a button that corresponds to at least the starting and stopping of the motor;

a receiver comprising a processor and at least two circuits each having a different electric resistance, wherein:

the processor is operatively connected to the radio wave transmitter and configured to received and decode radio waves emitted therefrom;

the processor is operatively connected to the motor by at least one wire such that the motor can be electronically controlled by the transmitter; and each circuit of the at least two circuits is configured to supply voltage to the motor;

a camshaft position sensor operatively connected to the processor of the receiver; and a pressure sensor configured to monitor the water pressure output by the pump, wherein the pressure sensor is operatively connected to the processor of the receiver;

wherein the receiver is configured to automatically vary which circuit is used to supply voltage to the motor in response to the pressure sensor detecting water pressure at a predetermined amount, thereby automatically idling up or down the motor and changing the water pressure output by the pump;

wherein the motor is adapted to rotate at different speeds depending on which water flow rate setting has been selected on the transmitter's water flow rate selector.

12. The device of claim 11 wherein the water flow rate selector provides for selecting between at least 4 different water flow rate settings.

13. The device of claim 11 wherein the transmitter further comprises a second button that corresponds to activating the water flow rate after a flow rate setting has been chosen using the water flow rate selector.

* * * * *